(12) United States Patent
Zacharias et al.

(10) Patent No.: US 10,244,527 B2
(45) Date of Patent: Mar. 26, 2019

(54) TECHNIQUES FOR DROPPING UPLINK GRANTS IN CARRIER AGGREGATION TO MITIGATE INTERMODULATION INTERFERENCE

(71) Applicant: QUALCOMM Incorporated, San Diego, CA (US)

(72) Inventors: Leena Zacharias, San Jose, CA (US); Aziz Gholmieh, Del Mar, CA (US); Liang Zhao, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/365,528

(22) Filed: Nov. 30, 2016

(65) Prior Publication Data

US 2017/0181159 A1 Jun. 22, 2017

Related U.S. Application Data

(60) Provisional application No. 62/269,718, filed on Dec. 18, 2015.

(51) Int. Cl.
H04W 72/04 (2009.01)
H04W 76/34 (2018.01)
H04L 5/00 (2006.01)

(52) U.S. Cl.
CPC ......... H04W 72/0446 (2013.01); H04L 5/001 (2013.01); H04L 5/0053 (2013.01);
(Continued)

(58) Field of Classification Search
CPC ............. H04W 72/0446; H04W 24/10; H04W 72/042; H04W 72/082; H04W 72/0413;
(Continued)

(56) References Cited

U.S. PATENT DOCUMENTS 8,767,647 B2 7/2014 Heo et al.
9,125,195 B2 9/2015 Lim et al.
(Continued)

OTHER PUBLICATIONS

International Search Report and Written Opinion—PCT/US2016/064404—ISA/EPO—dated Mar. 17, 2017.
(Continued)

*Primary Examiner* — Sai Aung
(74) *Attorney, Agent, or Firm* — Harrity & Harrity, LLP/Qualcomm Incorporated

(57) ABSTRACT

Aspects of the present disclosure generally relate to wireless communications. In some aspects, a device may receive a first uplink grant for a first cell that uses a first component carrier, and may receive a second uplink grant for a second cell that uses a second component carrier. The device may determine at least one of: a number of subframes for which uplink data is transmitted on both the first cell and the second cell during a time period, or a resource block allocation associated with the first cell and the second cell. The device may drop at least one of the first uplink grant or the second uplink grant based at least in part on at least one of: a determination that the number of subframes satisfies a threshold number of subframes, or a determination that the resource block allocation satisfies a condition.

30 Claims, 25 Drawing Sheets

(52) U.S. Cl.
CPC .......... *H04L 5/0066* (2013.01); *H04L 5/0098* (2013.01); *H04W 76/34* (2018.02); *H04L 5/0046* (2013.01)

(58) Field of Classification Search
CPC . H04W 24/02; H04W 24/08; H04W 72/0426; H04W 72/085; H04W 52/243; H04W 72/04
See application file for complete search history.

(56) References Cited

U.S. PATENT DOCUMENTS

| | | | |
|---|---|---|---|
| 2010/0233962 A1* | 9/2010 | Johansson | H04W 52/343 455/63.1 |
| 2011/0274063 A1 | 11/2011 | Li | |
| 2013/0010659 A1 | 1/2013 | Chen et al. | |
| 2013/0083766 A1 | 4/2013 | Chung et al. | |
| 2013/0250871 A1 | 9/2013 | Kaukovuori et al. | |
| 2014/0198766 A1* | 7/2014 | Sionnina | H04W 72/082 370/330 |
| 2016/0219475 A1* | 7/2016 | Kim | H04W 76/025 |
| 2017/0064705 A1* | 3/2017 | Lee | H04L 1/0026 |
| 2017/0347270 A1* | 11/2017 | Iouchi | H04W 16/14 |
| 2018/0019775 A1* | 1/2018 | Kim | H04B 15/02 |

OTHER PUBLICATIONS

Qualcomm Incorporated: "In-Device Co-existence for UL Inter-Band CA Interference on GNSS Receiver", 3GPP Draft, R2-150471—IDC for UL CA Interference to GNSS, 3rd Generation Partnership Project (3GPP), Mobile Competence Centre , 650, Route Des Lucioles, F-86921, Sophia-Antipolis Cedex, France, vol. RAN WG2, No. Athens, Greece; Feb. 9, 2015-Feb. 13, 2015, Feb. 8, 2015, XP050935726, 8 pages. Retrieved from the Internet: URL:http://www.3gpp.org/ftp/Meetings_3GPP_SYNC/RAN2/Docs/.

* cited by examiner

|  | UE Rx | Beidou | Galileo | GLONASS | GPS | ISM 2.4GHz | ISM 5 GHz |
|---|---|---|---|---|---|---|---|
| CA_2A-4A | IMD3, IMD5 | IMD3, IMD5 | IMD3, IMD5 | IMD3 | IMD3, IMD5 | | 3rd harmonic, IMD3, IMD5 |
| CA_3A-5A | IMD2, IMD4, IMD5 | IMD5 | IMD5 | IMD5 | IMD5 | 3rd harmonic | 3rd harmonic, IMD4, IMD5 |

FIG. 8

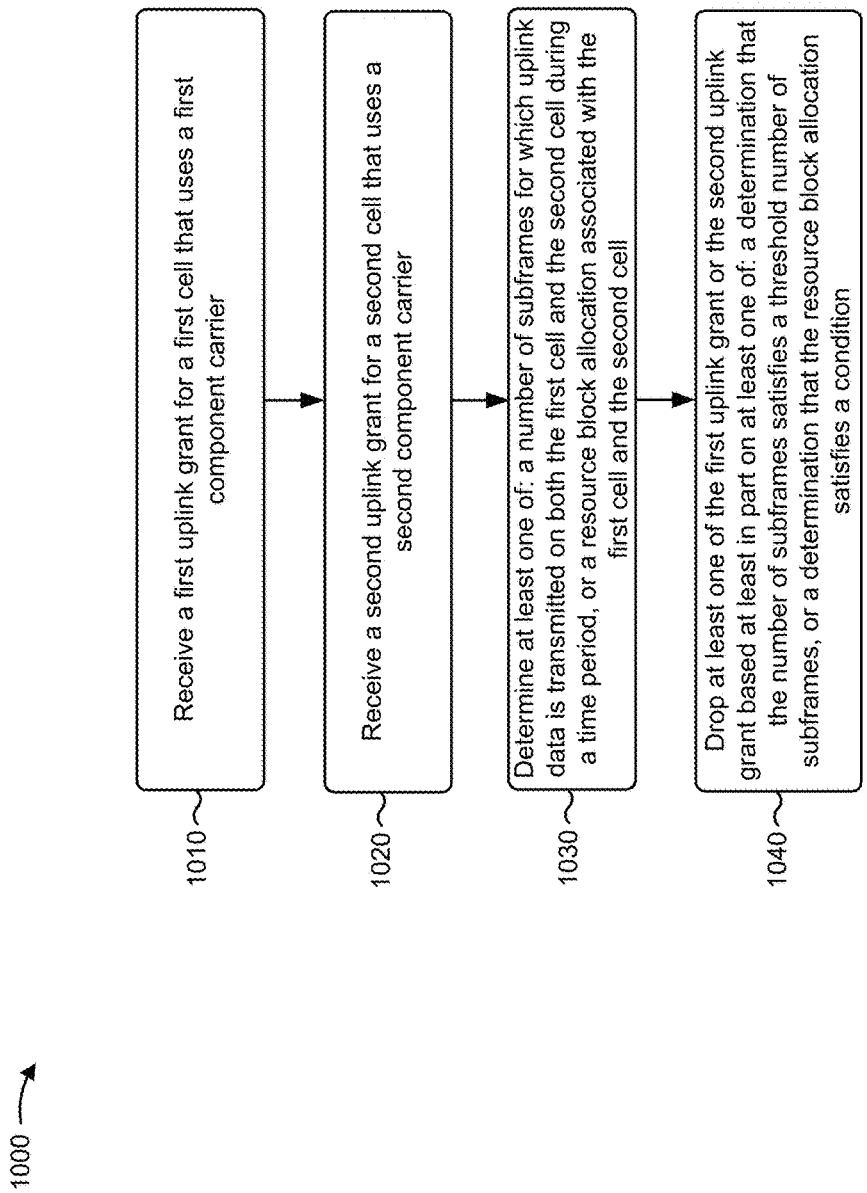

TECHNIQUES FOR DROPPING UPLINK GRANTS IN CARRIER AGGREGATION TO MITIGATE INTERMODULATION INTERFERENCE

CROSS-REFERENCE TO RELATED APPLICATIONS UNDER 35 U.S.C. § 119

This application claims priority to U.S. Provisional Patent Application No. 62/269,718, filed on Dec. 18, 2015, entitled "TECHNIQUES FOR DROPPING UPLINK GRANTS IN CARRIER AGGREGATION TO MITIGATE INTERMODULATION INTERFERENCE," which is hereby expressly incorporated by reference herein.

FIELD OF THE DISCLOSURE

Aspects of the present disclosure generally relate to wireless communications, and more particularly to techniques for dropping uplink grants in carrier aggregation to mitigate intermodulation interference.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method for wireless communication may include receiving, by a user equipment, a first uplink grant for a first cell that uses a first component carrier. The method may include receiving, by the user equipment, a second uplink grant for a second cell that uses a second component carrier. The method may include determining, by the user equipment, at least one of: a number of subframes for which uplink data is transmitted on both the first cell and the second cell during a time period, or a resource block allocation associated with the first cell and the second cell. The method may include dropping, by the user equipment, at least one of the first uplink grant or the second uplink grant based at least in part on at least one of: a determination that the number of subframes satisfies a threshold number of subframes, or a determination that the resource block allocation satisfies a condition.

In some aspects, the first uplink grant and the second uplink grant are for a same subframe. In some aspects, the condition indicates that the resource block allocation causes intermodulation interference with a radio frequency spectrum band. In some aspects, the radio frequency spectrum band is associated with a global navigation satellite system. In some aspects, the threshold number of subframes is associated with interference to the global navigation satellite system.

In some aspects, the first cell is a primary cell and the second cell is a secondary cell, and the method includes dropping the second uplink grant for the secondary cell. In some aspects, the first cell is a primary cell and the second cell is a secondary cell, and the method includes determining that the second uplink grant is to be used for control information to be provided via the secondary cell, and dropping the first uplink grant for the primary cell based at least in part on determining that the second uplink grant is to be used for the control information.

In some aspects, the first uplink grant and the second uplink grant are for a subframe, and the time period includes the subframe. In some aspects, the time period is a static time period determined based at least in part on timing boundaries associated with a global navigation satellite system. In some aspects, the threshold number of subframes represents all subframes in the time period. In some aspects, the condition is based at least in part on a first intermodulation coefficient, a first frequency associated with a first resource block allocation on the first cell, a second intermodulation coefficient, a second frequency associated with a second resource block allocation on the second cell, and a frequency range associated with a radio frequency spectrum band.

In some aspects, the method includes marking a subframe associated with the first uplink grant and the second uplink grant as having intermodulation interference based at least in part on a determination that the condition is satisfied and the number of subframes does not satisfy the threshold number of subframes, and storing the marking for use with the time period. In some aspects, the method includes marking a subframe associated with the first uplink grant and the second uplink grant as being free from intermodulation interference based at least in part on a determination that the condition is not satisfied or the number of subframes satisfies the threshold number of subframes, and storing the marking for use with the time period.

In some aspects, a user equipment for wireless communication may include memory and one or more processors, coupled to the memory, to receive a first uplink grant for a first cell that uses a first component carrier. The one or more processors may receive a second uplink grant for a second cell that uses a second component carrier. The one or more processors may determine at least one of: a number of subframes for which uplink data is transmitted on both the first cell and the second cell during a time period, or a resource block allocation associated with the first cell and the second cell. The one or more processors may drop at least one of the first uplink grant or the second uplink grant based at least in part on at least one of: a determination that the number of subframes satisfies a threshold number of subframes, or a determination that the resource block allocation satisfies a condition.

In some aspects, the first uplink grant and the second uplink grant are for a same subframe. In some aspects, the condition indicates that the resource block allocation causes intermodulation interference with a radio frequency spectrum band. In some aspects, the radio frequency spectrum band is associated with a global navigation satellite system. In some aspects, the threshold number of subframes is associated with interference to the global navigation satellite system.

In some aspects, the first cell is a primary cell and the second cell is a secondary cell, and the one or more processors may drop the second uplink grant for the secondary cell. In some aspects, the first cell is a primary cell and the second cell is a secondary cell, and the one or more processors may determine that the second uplink grant is to be used for control information to be provided via the secondary cell, and may drop the first uplink grant for the primary cell based at least in part on determining that the second uplink grant is to be used for the control information.

In some aspects, the first uplink grant and the second uplink grant are for a subframe, and the time period includes the subframe. In some aspects, the time period is a static time period determined based at least in part on timing boundaries associated with a global navigation satellite system. In some aspects, the threshold number of subframes represents all subframes in the time period. In some aspects, the condition is based at least in part on a first intermodulation coefficient, a first frequency associated with a first resource block allocation on the first cell, a second intermodulation coefficient, a second frequency associated with a second resource block allocation on the second cell, and a frequency range associated with a radio frequency spectrum band.

In some aspects, the one or more processors may mark a subframe associated with the first uplink grant and the second uplink grant as having intermodulation interference based at least in part on a determination that the condition is satisfied and the number of subframes does not satisfy the threshold number of subframes, and may store the marking for use with the time period. In some aspects, the one or more processors may mark a subframe associated with the first uplink grant and the second uplink grant as being free from intermodulation interference based at least in part on a determination that the condition is not satisfied or the number of subframes satisfies the threshold number of subframes, and may store the marking for use with the time period.

In some aspects, a non-transitory computer-readable medium may store one or more instructions for wireless communication. The one or more instructions, when executed by one or more processors, may cause the one or more processors to receive a first uplink grant for a first cell that uses a first component carrier. The one or more instructions may cause the one or more processors to receive a second uplink grant for a second cell that uses a second component carrier. The one or more instructions may cause the one or more processors to determine at least one of: a number of subframes for which uplink data is transmitted on both the first cell and the second cell during a time period, or a resource block allocation associated with the first cell and the second cell. The one or more instructions may cause the one or more processors to drop at least one of the first uplink grant or the second uplink grant based at least in part on at least one of: a determination that the number of subframes satisfies a threshold number of subframes, or a determination that the resource block allocation satisfies a condition.

In some aspects, the first uplink grant and the second uplink grant are for a same subframe. In some aspects, the condition indicates that the resource block allocation causes intermodulation interference with a radio frequency spectrum band. In some aspects, the radio frequency spectrum band is associated with a global navigation satellite system. In some aspects, the threshold number of subframes is associated with interference to the global navigation satellite system.

In some aspects, the first cell is a primary cell and the second cell is a secondary cell, and the one or more instructions may cause the one or more processors to drop the second uplink grant for the secondary cell. In some aspects, the first cell is a primary cell and the second cell is a secondary cell, and the one or more instructions may cause the one or more processors to determine that the second uplink grant is to be used for control information to be provided via the secondary cell, and to drop the first uplink grant for the primary cell based at least in part on determining that the second uplink grant is to be used for the control information.

In some aspects, the first uplink grant and the second uplink grant are for a subframe, and the time period includes the subframe. In some aspects, the time period is a static time period determined based at least in part on timing boundaries associated with a global navigation satellite system. In some aspects, the threshold number of subframes represents all subframes in the time period. In some aspects, the condition is based at least in part on a first intermodulation coefficient, a first frequency associated with a first resource block allocation on the first cell, a second intermodulation coefficient, a second frequency associated with a second resource block allocation on the second cell, and a frequency range associated with a radio frequency spectrum band.

In some aspects, the one or more instructions may cause the one or more processors to mark a subframe associated with the first uplink grant and the second uplink grant as having intermodulation interference based at least in part on a determination that the condition is satisfied and the number of subframes does not satisfy the threshold number of subframes, and to store the marking for use with the time period. In some aspects, the one or more instructions may cause the one or more processors to mark a subframe associated with the first uplink grant and the second uplink grant as being free from intermodulation interference based at least in part on a determination that the condition is not satisfied or the number of subframes satisfies the threshold number of subframes, and to store the marking for use with the time period.

In some aspects, an apparatus for wireless communication may include means for receiving a first uplink grant for a first cell that uses a first component carrier. The apparatus may include means for receiving a second uplink grant for a second cell that uses a second component carrier. The apparatus may include means for determining at least one of: a number of subframes for which uplink data is transmitted on both the first cell and the second cell during a time period, or a resource block allocation associated with the first cell and the second cell. The apparatus may include means for dropping at least one of the first uplink grant or the second uplink grant based at least in part on at least one of: a determination that the number of subframes satisfies a threshold number of subframes, or a determination that the resource block allocation satisfies a condition.

In some aspects, the first uplink grant and the second uplink grant are for a same subframe. In some aspects, the condition indicates that the resource block allocation causes intermodulation interference with a radio frequency spectrum band. In some aspects, the radio frequency spectrum band is associated with a global navigation satellite system. In some aspects, the threshold number of subframes is associated with interference to the global navigation satellite system.

In some aspects, the first cell is a primary cell and the second cell is a secondary cell, and the apparatus may include means for dropping the second uplink grant for the secondary cell. In some aspects, the first cell is a primary cell and the second cell is a secondary cell, and the apparatus may include means for determining that the second uplink grant is to be used for control information to be provided via the secondary cell, and means for dropping the first uplink grant for the primary cell based at least in part on determining that the second uplink grant is to be used for the control information.

In some aspects, the first uplink grant and the second uplink grant are for a subframe, and the time period includes the subframe. In some aspects, the time period is a static time period determined based at least in part on timing boundaries associated with a global navigation satellite system. In some aspects, the threshold number of subframes represents all subframes in the time period. In some aspects, the condition is based at least in part on a first intermodulation coefficient, a first frequency associated with a first resource block allocation on the first cell, a second intermodulation coefficient, a second frequency associated with a second resource block allocation on the second cell, and a frequency range associated with a radio frequency spectrum band.

In some aspects, the apparatus may include means for marking a subframe associated with the first uplink grant and the second uplink grant as having intermodulation interference based at least in part on a determination that the condition is satisfied and the number of subframes does not satisfy the threshold number of subframes, and means for storing the marking for use with the time period. In some aspects, the apparatus may include means for marking a subframe associated with the first uplink grant and the second uplink grant as being free from intermodulation interference based at least in part on a determination that the condition is not satisfied or the number of subframes satisfies the threshold number of subframes, and means for storing the marking for use with the time period.

Aspects generally include a method, apparatus, system, computer program product, non-transitory computer-readable medium, and user equipment as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating examples of intermodulation interference in carrier aggregation, in accordance with various aspects of the present disclosure;

FIG. 10 is a flow diagram of an example process for dropping uplink grants in carrier aggregation to mitigate intermodulation interference, in accordance with various aspects of the present disclosure.

DETAILED DESCRIPTION

Figure 1:
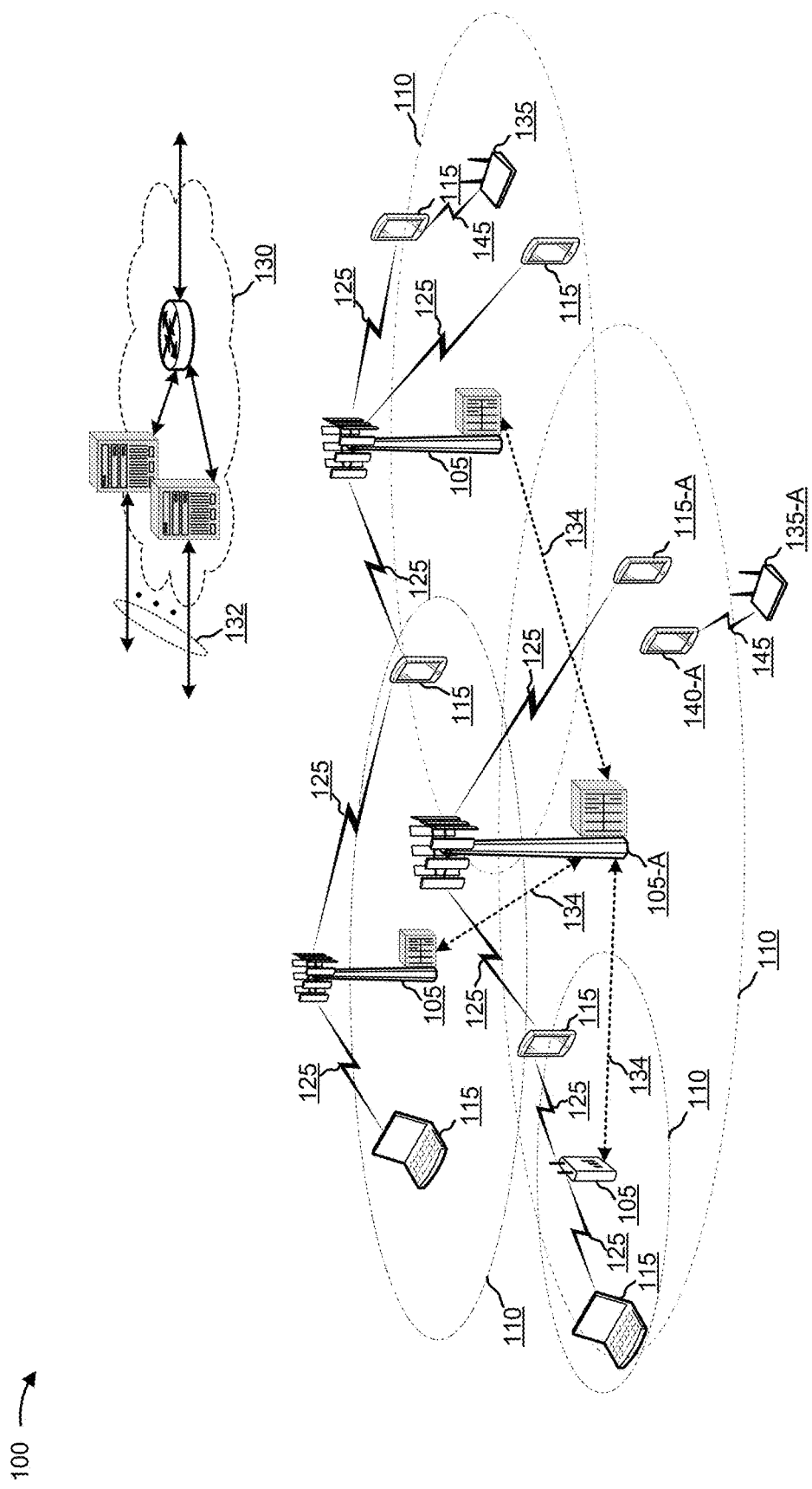
FIG. 1 is an illustration of an example wireless communication system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

A user equipment (UE) may be configured for carrier aggregation using multiple component carriers. In some cases, uplink carrier aggregation transmissions (e.g., on multiple component carriers) may cause intermodulation interference, also known as intermodulation distortion, with one or more radio frequency spectrum bands. For example, modulation of signals with different frequencies (e.g., on a first component carrier and a second component carrier), may form additional signals at other frequencies, thereby causing intermodulation interference when signals on multiple component carriers are transmitted simultaneously or concurrently.

As an example, uplink carrier aggregation may generate intermodulation interference that falls in a radio frequency (RF) spectrum band used for global navigation satellite systems (GNSS). GNSS may be used for determining positioning of the UE, and such intermodulation interference may disrupt GNSS signals, resulting in inaccurate or indeterminate positioning, errors in the GNSS signals, or the like.

Techniques described herein may be used to mitigate intermodulation interference when a UE is configured for carrier aggregation, and particularly to mitigate intermodulation interference in RF spectrum bands associated with GNSS. In this way, a position of the UE may be determined more accurately, errors in GNSS signals may be reduced, or the like.

The techniques described herein may be used for one or more of various wireless communication networks, such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT), such as universal terrestrial radio access (UTRA), CDMA2000, or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

FIG. 1 is an illustration of an example wireless communication system 100, in accordance with various aspects of the disclosure. The wireless communication system 100 may include a WWAN network, such as a cellular network, and a WLAN network, such as a Wi-Fi network. The cellular network may include one or more base stations 105, 105-A, one or more UEs 115, 115-A, and a core network 130. The Wi-Fi network may include one or more WLAN access points 135, 135-A (e.g., Wi-Fi access points) and one or more WLAN stations 140, 140-A (e.g., Wi-Fi stations).

With reference to the cellular network of the wireless communication system 100, the core network 130 may provide user authentication, access authorization, tracking, Internet Protocol (IP) connectivity, and other access, routing, or mobility functions. The base stations 105, 105-A may interface with the core network 130 through backhaul links 132 (e.g., S1, etc.) and may perform radio configuration and scheduling for communication with the UEs 115, 115-A, or may operate under the control of a base station controller (not shown). In various examples, the base stations 105, 105-A may communicate, either directly or indirectly (e.g., through core network 130), with each other over backhaul links 134 (e.g., X2, etc.), which may be wired or wireless communication links.

The base stations 105, 105-A may wirelessly communicate with the UEs 115, 115-A via one or more base station antennas. Each of the base station 105, 105-A sites may provide communication coverage for a respective geographic coverage area 110. In some examples, a base station 105, 105-A may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-A may be divided into sectors making up a portion of the coverage area (not shown). The cellular network may include base stations 105, 105-A of different types (e.g., macro and/or small cell base stations). There may be overlapping geographic coverage areas 110 for different technologies.

In some examples, the cellular network may include an LTE/LTE-A network. In LTE/LTE-A networks, the term evolved Node B (eNB) may be used to describe the base stations 105, 105-A, while the term UE may be used to describe the UEs 115, 115-A. The cellular network may be a Heterogeneous LTE/LTE-A network in which different types of eNBs provide coverage for various geographical regions. For example, each eNB or base station 105, 105-A may provide communication coverage for a macro cell, a small cell, and/or another type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, or the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115, 115-A and the base stations 105, 105-A or core network 130 supporting radio bearers for the user plane data. At the Physical (PHY) layer, the transport channels may be mapped to Physical channels.

The UEs 115, 115-A may be dispersed throughout the wireless communication system 100, and each UE 115, 115-A may be stationary or mobile. A UE 115, 115-A may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-A may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-A and network equipment, including macro eNBs, small cell eNBs, relay base stations, or the like.

The communication links 125 shown in wireless communication system 100 may carry downlink (DL) transmissions from a base station 105, 105-A to a UE 115, 115-A, and/or uplink (UL) transmissions from a UE 115, 115-A to a base station 105, 105-A. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105, 105-A and/or UEs 115, 115-A may include multiple antennas for employing antenna diversity schemes to improve communication quality and reliability between base stations 105, 105-A and UEs 115, 115-A.

Additionally or alternatively, base stations 105, 105-A and/or UEs 115, 115-A may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multicarrier operation. A carrier may also be referred to as a component carrier (CC), a layer, a channel, etc. The terms "carrier," "component carrier," "cell," and "channel" may be used interchangeably herein. A UE 115, 115-A may be configured with multiple downlink CCs and one or more uplink CCs for carrier aggregation. Carrier aggregation may be used with both FDD and TDD component carriers.

With reference to the Wi-Fi network of the wireless communication system 100, the WLAN access points 135, 135-A may wirelessly communicate with the WLAN stations 140, 140-A via one or more WLAN access point antennas, over one or more communication links 145. In some examples, the WLAN access points 135, 135-A may communicate with the WLAN stations 140, 140-A using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac).

In some examples, a WLAN station 140, 140-A may be a cellular phone, a personal digital assistant (PDA), a wireless communication device, a handheld device, a tablet computer, a laptop computer, or the like. In some examples, an apparatus may include aspects of both a UE 115, 115-A and a WLAN station 140, 140-A, and such an apparatus may communicate with one or more base stations 105, 105-A using a first radio access technology (RAT) (e.g., a cellular RAT or multiple cellular RATs), and communicate with one or more WLAN access points 135, 135-A using a second RAT (e.g., a Wi-Fi RAT or multiple Wi-Fi RATs).

In some examples, the base stations 105, 105-A and UEs 115, 115-A may communicate over a licensed radio frequency spectrum band and/or an unlicensed radio frequency spectrum band, whereas the WLAN access points 135, 135-A and WLAN stations 140, 140-A may communicate over the unlicensed radio frequency spectrum band. The unlicensed radio frequency spectrum band may therefore be shared by the base stations 105, 105-A, the UEs 115, 115-A, the WLAN access points 135, 135-A, and/or the WLAN stations 140, 140-A.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2:
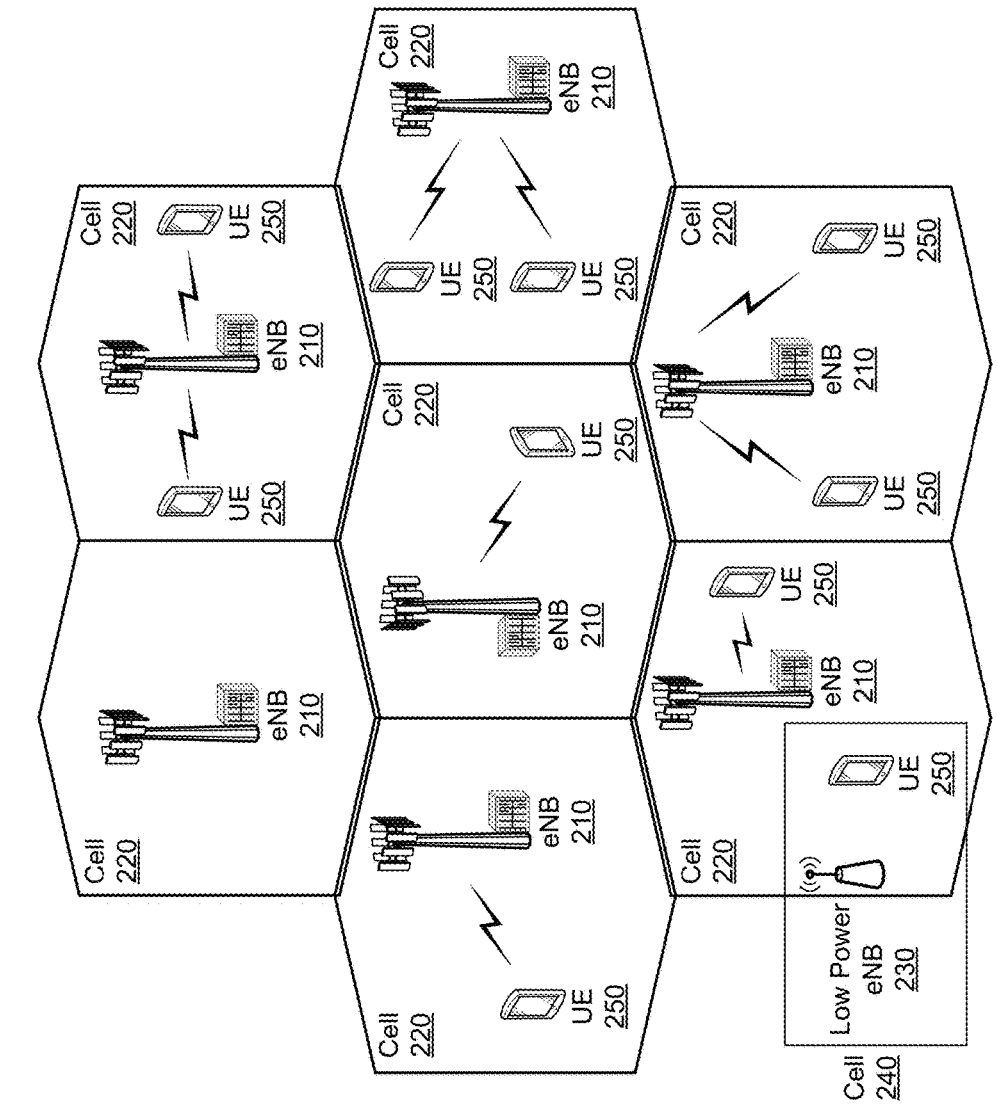
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include a set of eNBs 210 that serve a corresponding set of cellular regions (cells) 220, a set of low power eNBs 230 that serve a corresponding set of cells 240, and a set of UEs 250.

Each eNB 210 may be assigned to a respective cell 220 and may be configured to provide an access point to a RAN. For example, eNB 210 may provide an access point for UE 250 to a RAN (e.g., eNB 210 may correspond to base station 105, shown in FIG. 1). UE 250 may correspond to UE 115, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity.

As shown in FIG. 2, one or more low power eNBs 230 may serve respective cells 240, which may overlap with one or more cells 220 served by eNBs 210. The low power eNBs 230 may correspond to base station 105, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, or the like), UMB, IEEE 802.11 (Wi-Fi), IEEE 802.16 (WiMAX), IEEE 802.20, Flash-OFDM employing OFDMA, or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
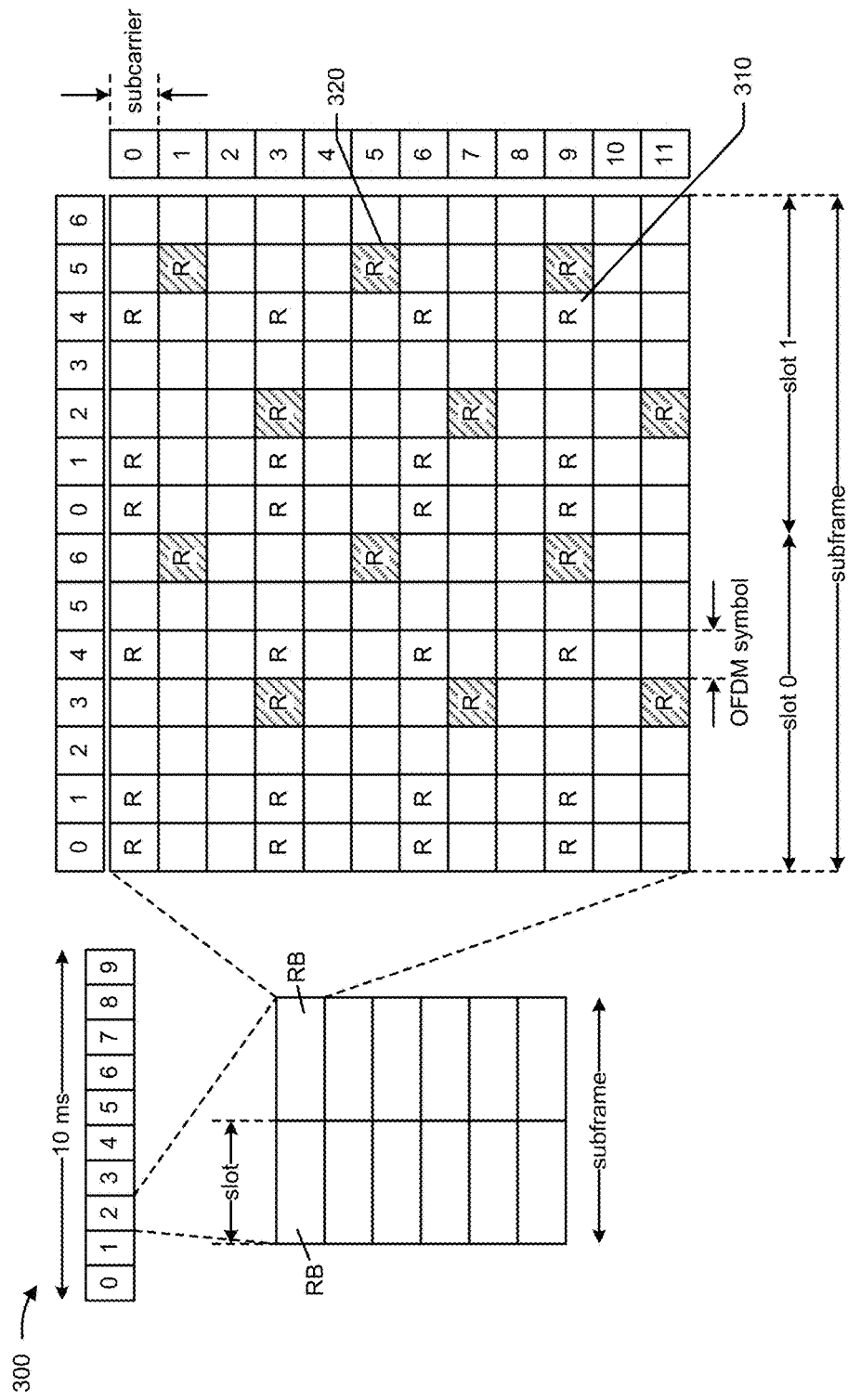
FIG. 3 is a diagram illustrating an example of a downlink (DL) frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
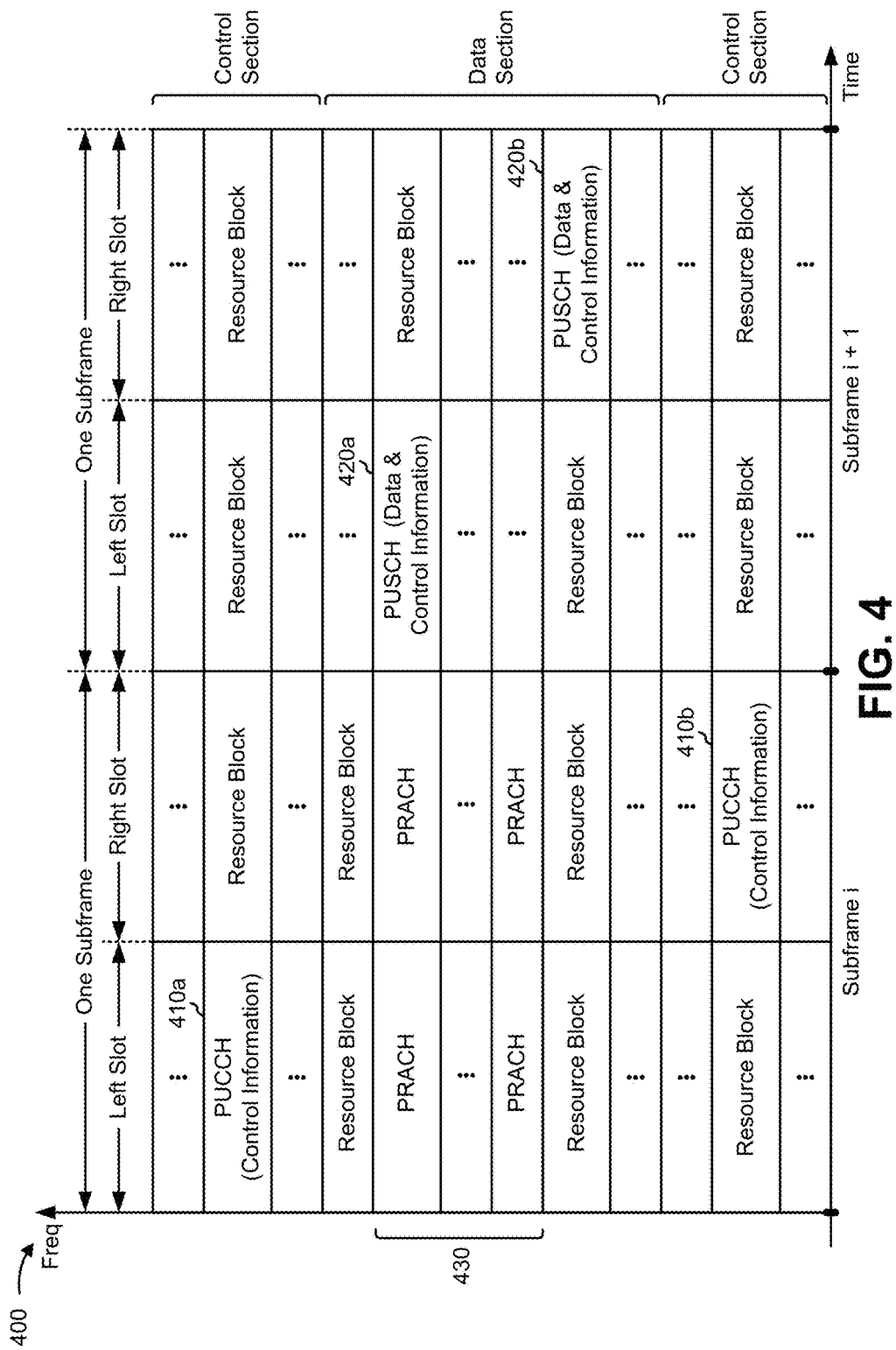
FIG. 4 is a diagram illustrating an example of an uplink (UL) frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. In some aspects, the UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes.

As indicated above, FIG. 4 is provided as an example. Other examples are possible and may differ from what was described above in connection with FIG. 4.

Figure 5:
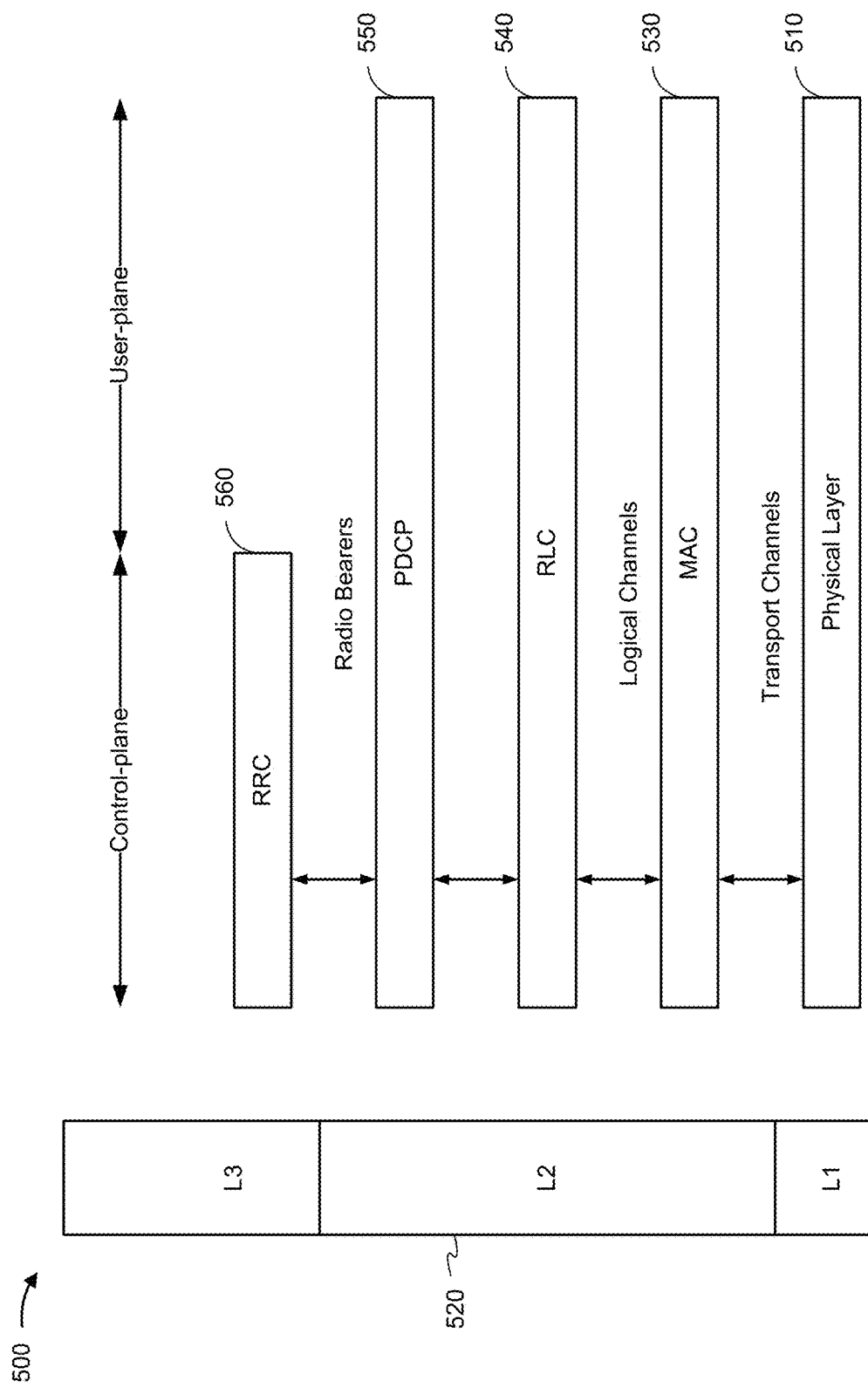
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes a media access control (MAC) sublayer 530, a radio link control (RLC) sublayer 540, and a packet data convergence protocol (PDCP) 550 sublayer, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. In some aspects, integrity protection may be provided for the control plane data. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
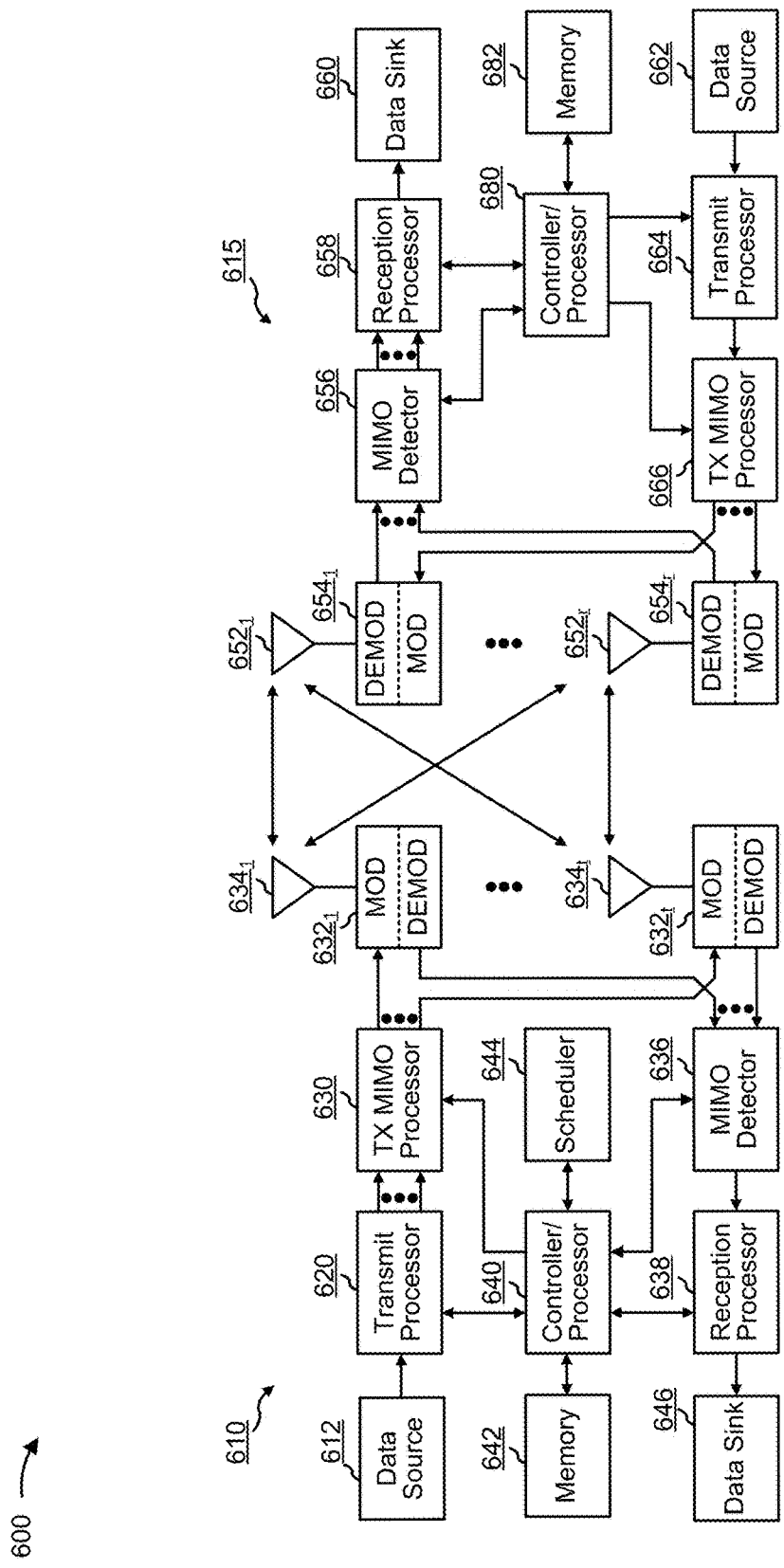
FIG. 6 is a diagram illustrating example components of a communication system including a base station and a UE, in accordance with various aspects of the present disclosure.

FIG. 6 is an illustration of example components of a communication system 600 including a base station 610 and a UE 615, in accordance with various aspects of the present disclosure. In some aspects, base station 610 may correspond to one or more of the base stations and/or eNBs 105, 105-A, 210, or 230 described with reference to FIG. 1 or 2. In some aspects, UE 615 may correspond to one or more of the UEs 115, 115-A, or 250 described above with reference to FIG. 1 or 2. Base station 610 may be equipped with antennas $634_{1-t}$, and UE 615 may be equipped with antennas $652_{1-r}$, wherein t and r are integers greater than or equal to one.

At base station 610, a base station transmit processor 620 may receive data from a base station data source 612 and control information from a base station controller/processor 640. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 620 may process (e.g., encode and symbol map) the data and control information to obtain data symbols and control symbols, respectively. Base station transmit processor 620 may also generate reference symbols, e.g., for the PSS, SSS, and cell-specific reference signal (RS). A base station transmit (TX) multiple-input multiple-output (MIMO) processor 630 may perform spatial processing (e.g., precoding) on the data symbols, the control symbols, and/or the reference symbols, if applicable, and may provide output symbol streams to base station modulators/demodulators (MODs/DEMODs) $632_{1-4}$. Each base station modulator/demodulator 632 may process a respective output symbol stream (e.g., for orthogonal frequency-division multiplexing (OFDM), or the like) to obtain an output sample stream. Each base station modulator/demodulator 632 may further process (e.g., convert to analog, amplify, filter, and upconvert) the output sample stream to obtain a downlink signal. Downlink signals from modulators/demodulators $623_{1-4}$ may be transmitted via antennas $634_{1-4}$, respectively.

At UE 615, UE antennas $652_{1-r}$ may receive the downlink signals from base station 610 and may provide received signals to UE modulators/demodulators (MODs/DEMODs) $654_{1-4}$, respectively. Each UE modulator/demodulator 654 may condition (e.g., filter, amplify, downconvert, and digitize) a respective received signal to obtain input samples. Each UE modulator/demodulator 654 may further process the input samples (e.g., for OFDM, etc.) to obtain received symbols. A UE MIMO detector 656 may obtain received symbols from all UE modulators/demodulators $654_{1-4}$, and perform MIMO detection on the received symbols, if applicable, and provide detected symbols. A UE reception processor 658 may process (e.g., demodulate, deinterleave, and decode) the detected symbols, provide decoded data for UE 615 to a UE data sink 660, and provide decoded control information to a UE controller/processor 680.

On the uplink, at UE 615, a UE transmit processor 664 may receive and process data (e.g., for the Physical Uplink Shared Channel (PUSCH)) from a UE data source 662 and control information (e.g., for the Physical Uplink Control Channel (PUCCH)) from UE controller/processor 680. UE transmit processor 664 may also generate reference symbols for a reference signal. The symbols from UE transmit processor 664 may be precoded by a UE TX MIMO processor 666, if applicable, may be further processed by UE modulator/demodulators $654_{1-r}$ (e.g., for SC-FDM, etc.), and may be transmitted to base station 610. At base station 610, the uplink signals from UE 615 may be received by base station antennas 634, processed by base station modulators/demodulators 632, detected by a base station MIMO detector 636, if applicable, and further processed by a base station reception processor 638 to obtain decoded data and control information sent by UE 615. Base station reception processor 638 may provide the decoded data to a base station data sink 646 and the decoded control information to base station controller/processor 640.

Base station controller/processor 640 and UE controller/processor 680 may direct the operation at base station 610 and UE 615, respectively. Base station controller/processor 640 and/or other processors and modules at base station 610 may perform or direct, for example, execution of various processes for the techniques described herein. UE controller/processor 680 and/or other processors and modules at UE 615 may also perform or direct, for example, execution of one or more blocks illustrated in FIG. 10, and/or other processes for the techniques described herein. A base station memory 642 and a UE memory 682 may store data and program codes for base station 610 and UE 615, respectively. A scheduler 644 may schedule UEs 615 for data transmission on the downlink and/or uplink.

In one configuration, UE 615 may include means for may include means for selectively dropping uplink grants in carrier aggregation to mitigate intermodulation interference, as described herein. In one aspect, the aforementioned means may be UE controller/processor 680, UE memory 682, UE reception processor 658, UE MIMO detector 656, UE modulators/demodulators 654, and/or UE antennas 652 configured to perform the functions recited by the aforementioned means. In another aspect, the aforementioned means may be a module or any apparatus configured to perform the functions recited by the aforementioned means.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single components shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
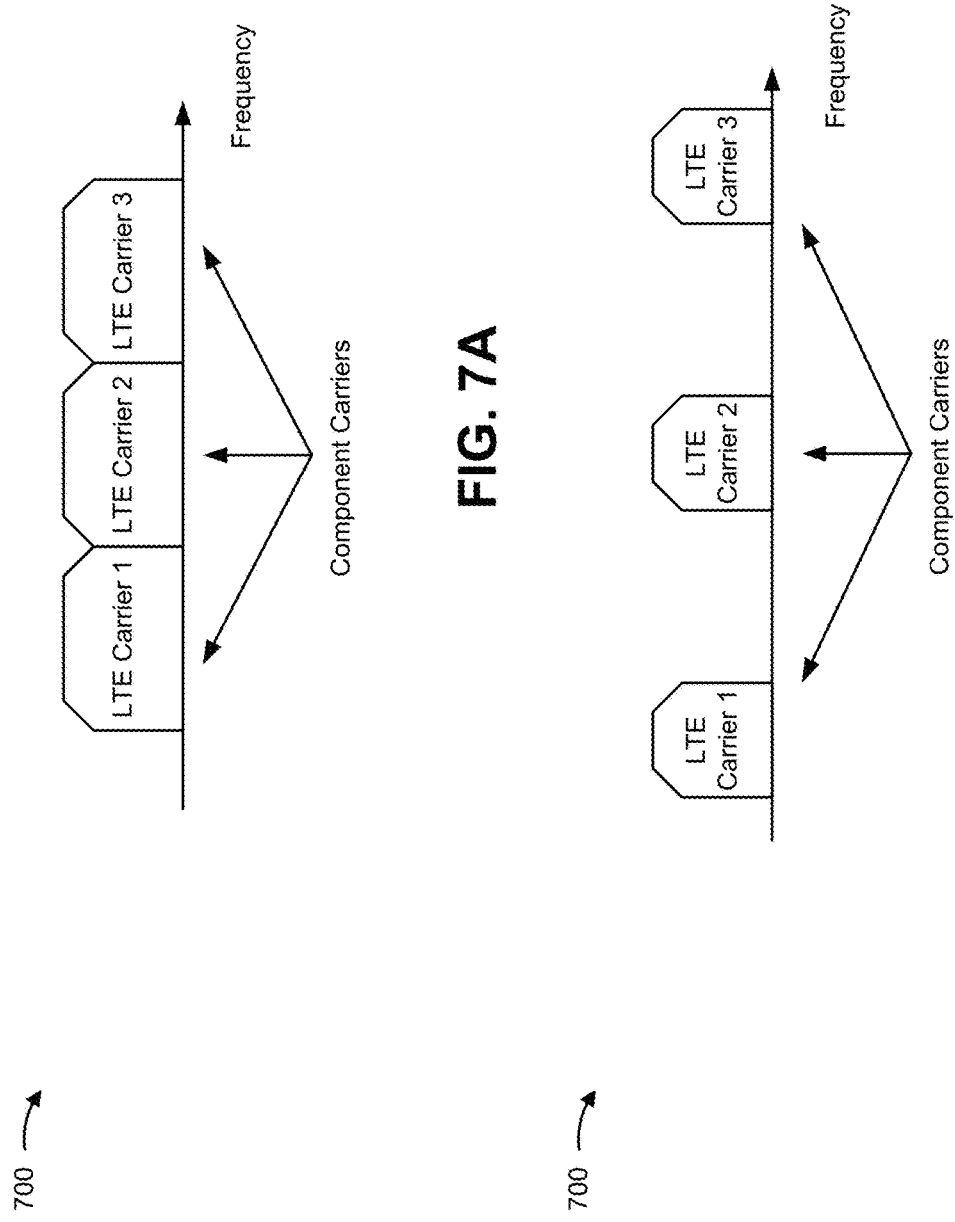
FIGS. 7A and 7B are diagrams illustrating example carrier aggregation types, in accordance with various aspects of the present disclosure.

FIGS. 7A and 7B are illustrations of examples 700 of carrier aggregation types, in accordance with various aspects of the present disclosure.

In some aspects, UE 615 may use spectrum of up to 20 MHz bandwidths allocated in a carrier aggregation of up to a total of 100 MHz (e.g., 5 component carriers) used for transmission and reception. For an LTE-Advanced enabled wireless communication system, two types of carrier aggregation (CA) methods may be used, contiguous CA and non-contiguous CA, which are illustrated in FIGS. 7A and 7B, respectively. Contiguous CA occurs when multiple available component carriers are adjacent to each other (e.g., as illustrated in FIG. 7A). On the other hand, non-contiguous CA occurs when multiple non-adjacent available component carriers are separated along the frequency band (e.g., as illustrated in FIG. 7B) and/or are included in different frequency bands.

Both non-contiguous and contiguous CA may aggregate multiple component carriers to serve a single unit of LTE-Advanced UEs 615. In various examples, UE 615 operating in a multicarrier system (e.g., also referred to as carrier aggregation) is configured to aggregate certain functions of multiple carriers, such as control and feedback functions, on the same carrier, which may be referred to as a primary carrier. The remaining carriers that depend on the primary carrier for support may be referred to as secondary carriers. For example, UE 615 may aggregate control functions, such as those provided by the optional dedicated channel (DCH), the nonscheduled grants, a physical uplink control channel (PUCCH), and/or a physical downlink control channel (PDCCH).

As indicated above, FIGS. 7A and 7B are provided as examples. Other examples are possible and may differ from what was described in connection with FIGS. 7A and 7B.

FIG. 8 is a diagram illustrating examples 800 of intermodulation interference in carrier aggregation, in accordance with various aspects of the present disclosure. FIG. 8 shows examples of uplink carrier aggregation configurations that may cause intermodulation interference.

For example, a UE 615 configured for carrier aggregation may generate intermodulation interference on one or more RF spectrum bands, such as an RF spectrum band used for UE reception (Rx), shown as UE Rx. Additionally, or alternatively, UE 615 may generate intermodulation interference on one or more RF spectrum bands used for GNSS, such as a GNSS band used in China (e.g., Beidou), a GNSS band used in Europe (e.g., Galileo), a GNSS band used in Russia (e.g., GLONASS), a GNSS band used in the United States (e.g., GPS), or the like. Additionally, or alternatively, UE 615 may generate intermodulation interference on one or more unlicensed RF spectrum bands, such as a 2.4 GHz industrial, scientific, and medical (ISM) RF spectrum band, a 5 GHz ISM RF spectrum band, or the like. Additionally, or alternatively, UE 615 may generate intermodulation interference on one or more RF spectrum bands associated with another type of wireless network, such as a wireless local area network (WLAN) (e.g., a WiFi network), a wireless personal area network (WPAN) (e.g., a Bluetooth network, a Zigbee network, etc.), or the like.

As an example, and as shown by reference number 810, UE 615 configured for 2A-4A carrier aggregation for uplink transmissions (shown as CA_2A-4A) may generate third-order intermodulation distortion (shown as IMD3), fifth-order intermodulation distortion frequency (shown as IMD5), and/or intermodulation distortion on the $3^{rd}$ harmonic frequency (shown as $3^{rd}$ harmonic) on various RF spectrum bands.

As another example, and as shown by reference number 820, UE 615 configured for 3-5A carrier aggregation for uplink transmissions (shown as CA_3-5A) may generate second-order intermodulation distortion (shown as IMD2), fourth-order intermodulation distortion (shown as IMD4), fifth-order intermodulation distortion frequency (shown as IMD5), and/or intermodulation distortion on the 3rd harmonic frequency (shown as $3^{rd}$ harmonic) on various RF spectrum bands.

Techniques described herein assist with mitigating such intermodulation distortion when UE 615 is configured for carrier aggregation for uplink transmissions, as described in more detail below.

As indicated above, FIG. 8 is provided as an example. Other examples are possible and may differ from what was described in connection with FIG. 8.

Figure 9A:
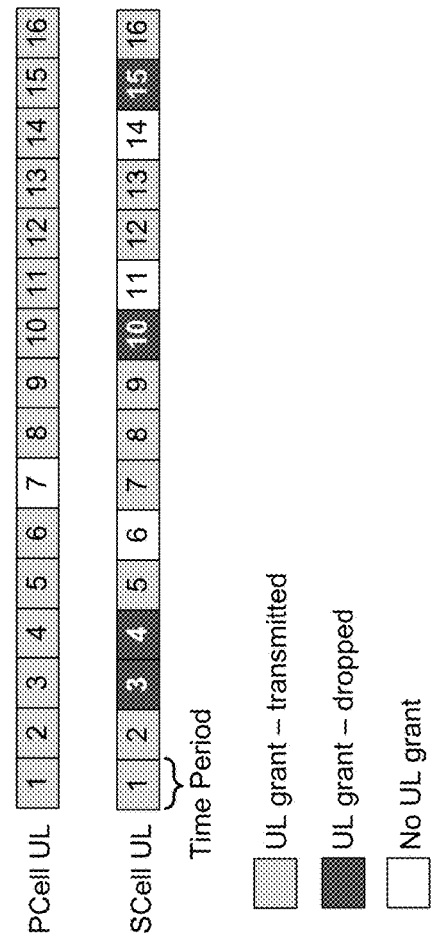
FIGS. 9A-9P are diagrams illustrating examples of selectively dropping uplink grants in carrier aggregation to mitigate intermodulation interference, in accordance with various aspects of the present disclosure.
Figure 9B:
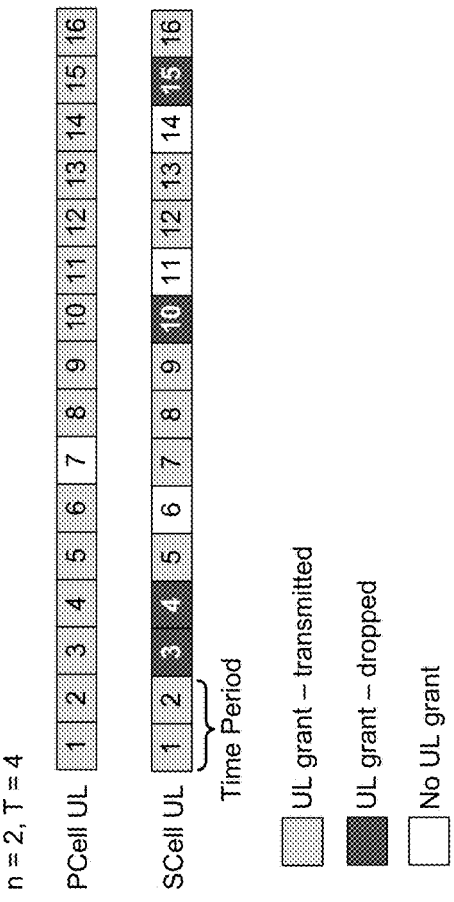
Figure 9C:
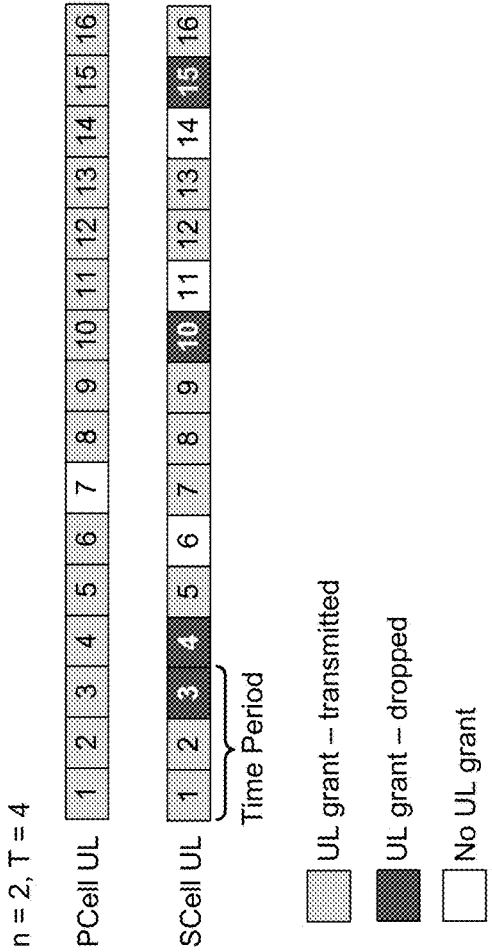
Figure 9D:
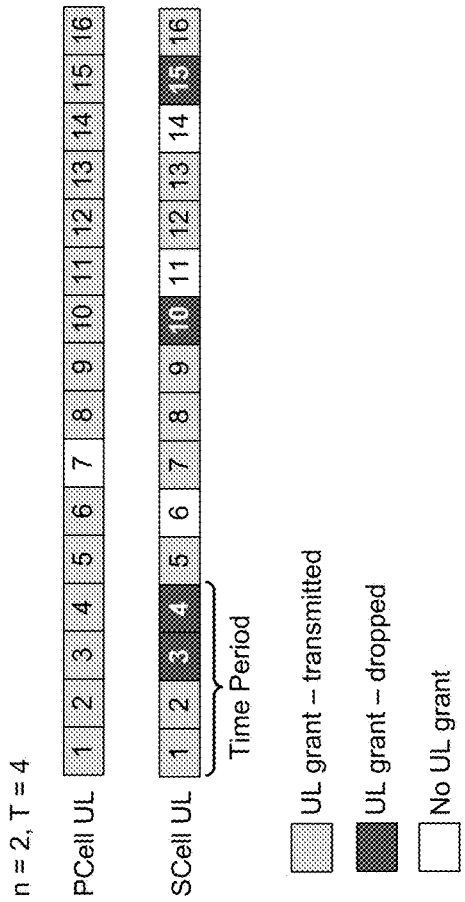
Figure 9E:
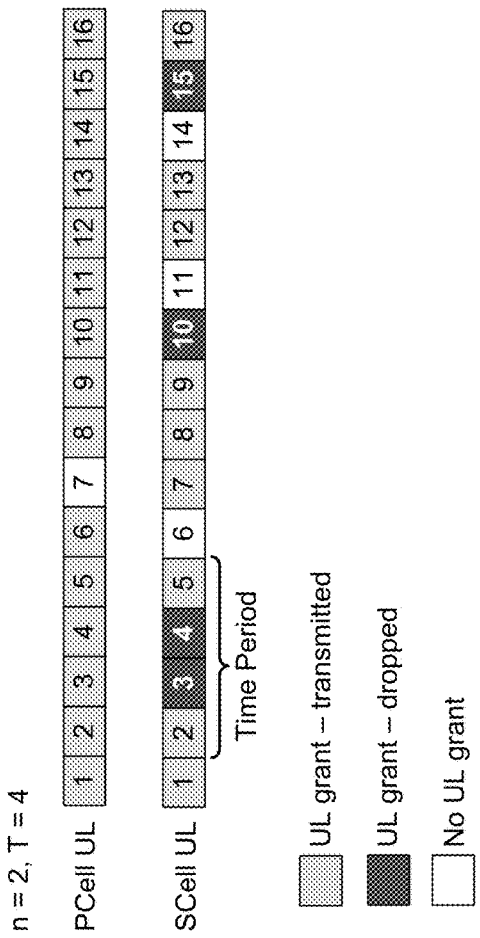
Figure 9F:
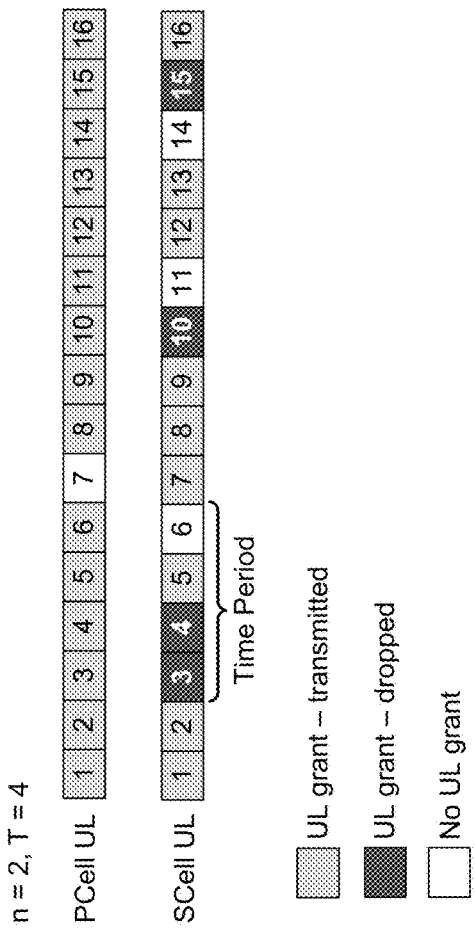
Figure 9G:
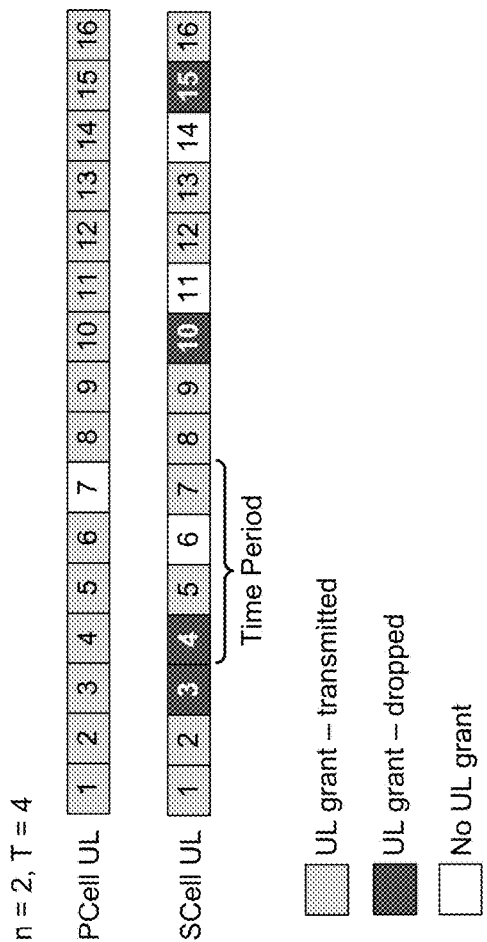
Figure 9H:
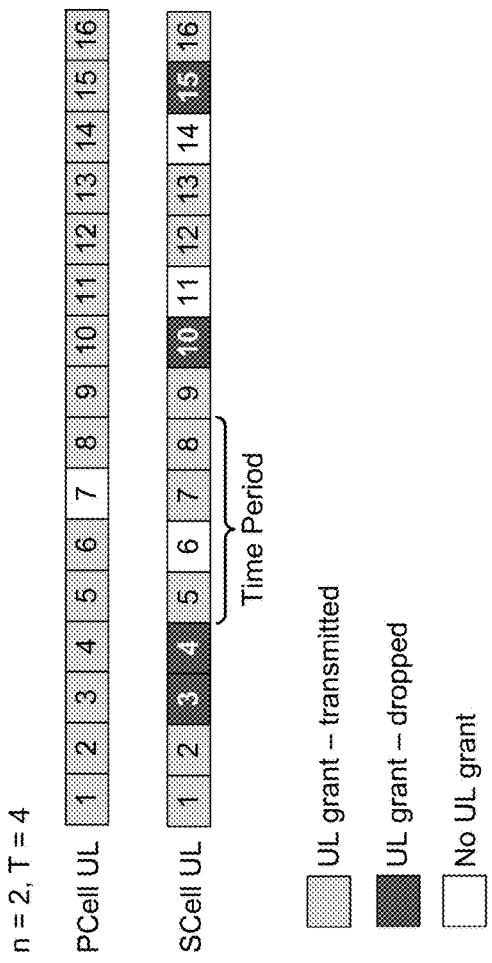
Figure 9I:
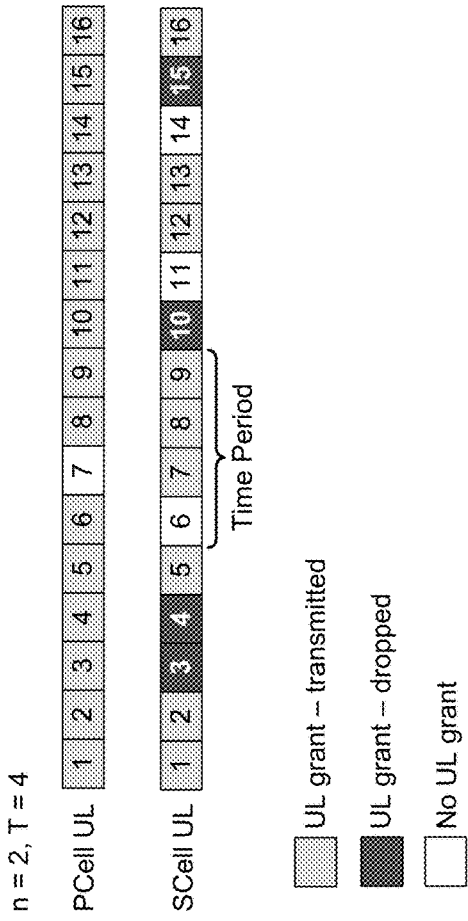
Figure 9J:
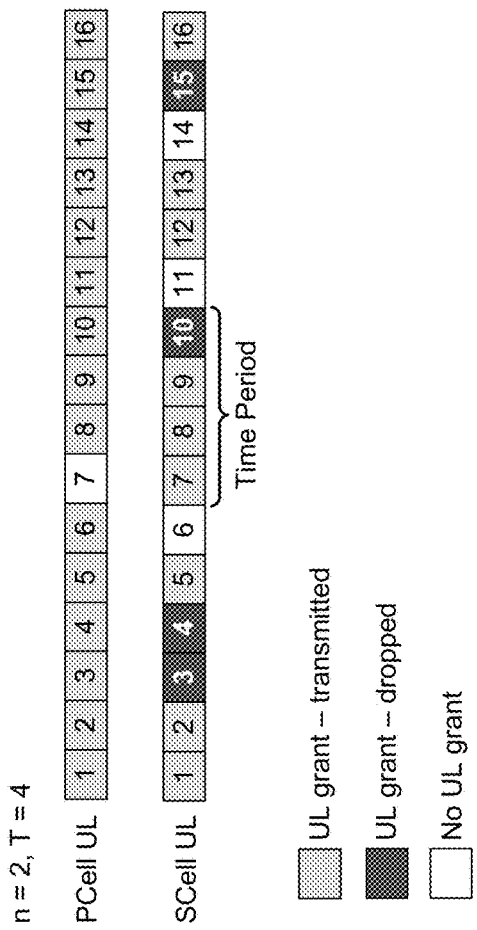
Figure 9K:
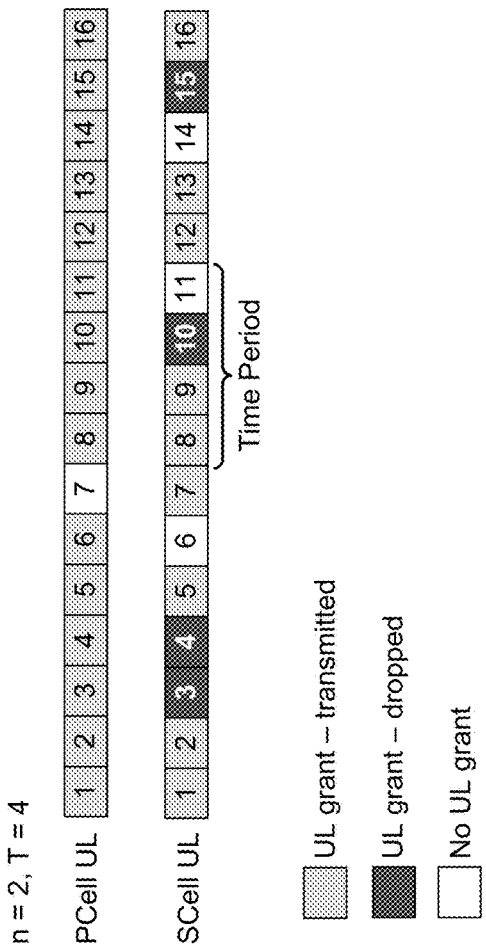
Figure 9L:
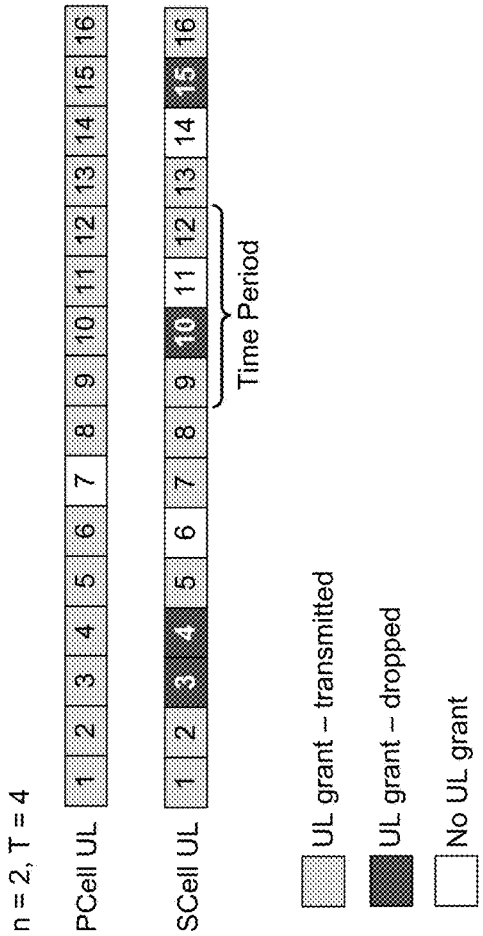
Figure 9M:
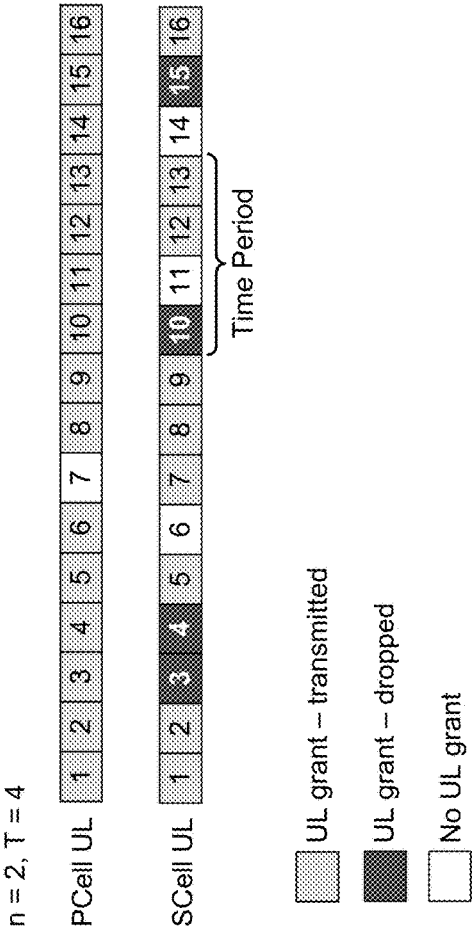
Figure 9N:
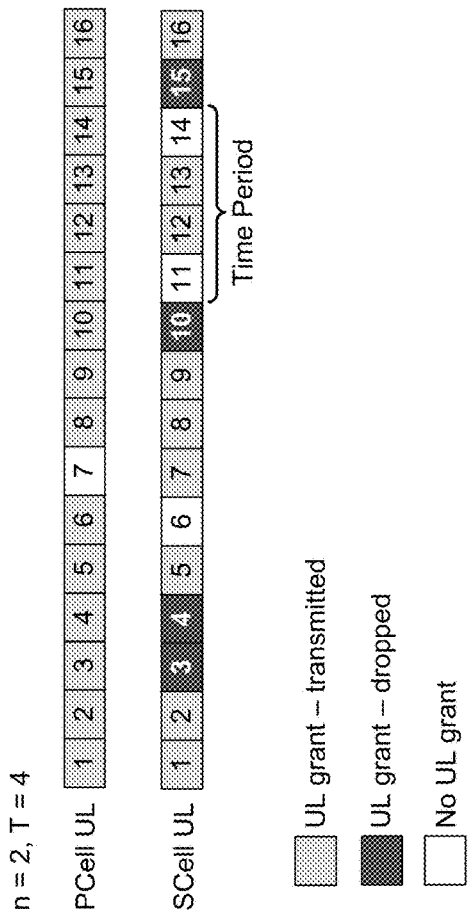
Figure 9O:
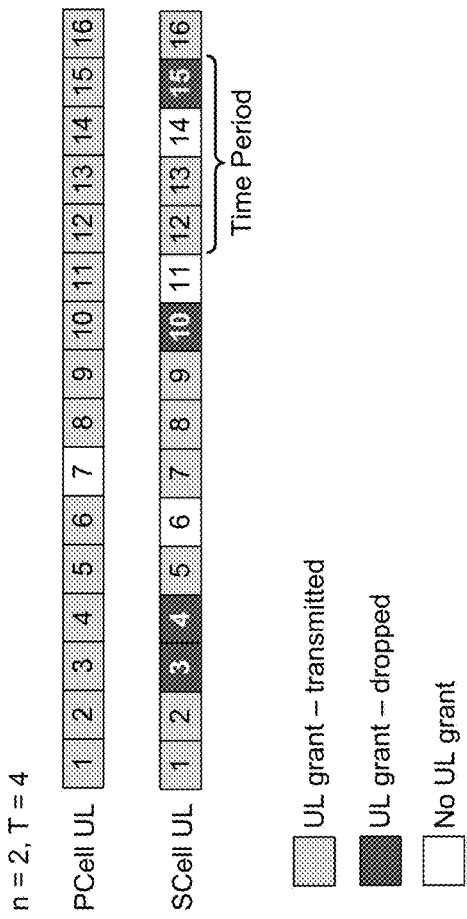
Figure 9P:
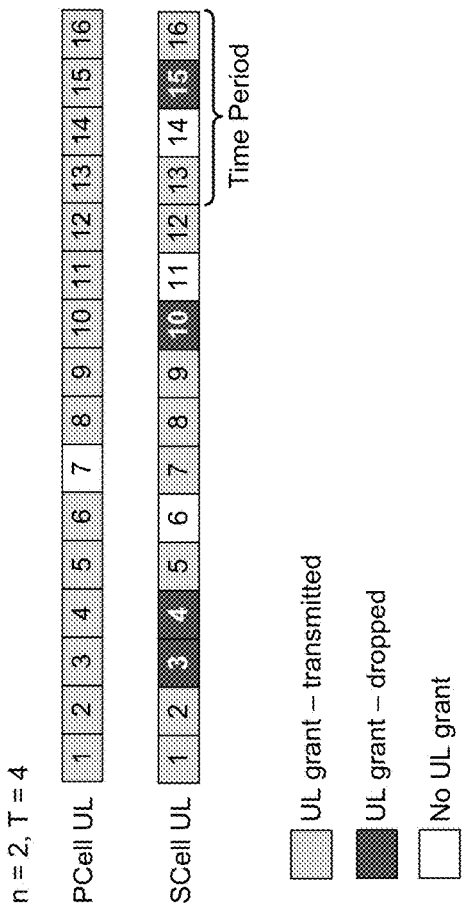

FIGS. 9A-9P are diagrams illustrating examples 900 of selectively dropping uplink grants in carrier aggregation to mitigate intermodulation interference, in accordance with various aspects of the present disclosure.

As shown in FIG. 9A, UE 615 may be configured for carrier aggregation using multiple component carriers for uplink transmissions. For example, UE 615 may be configured with a first cell, such as a primary cell (shown as PCell), that uses a first component carrier. Further, UE 615 may be configured with a second cell, such as a secondary cell (shown as SCell), that uses a second component carrier. The first cell may be associated with a first carrier frequency, and the second cell may be configured with a second carrier frequency.

In some aspects, UE 615 may be configured to allocate one or more resource blocks, on the first carrier frequency, associated with a first subcarrier frequency g1. Further, UE 615 may be configured to transmit uplink transmissions using one or more resource blocks, on the second carrier frequency, associated with a second subcarrier frequency g2. For example, UE 615 may be configured to transmit uplink data via allocated resource blocks (e.g., resource blocks allocated by base station 610). In some aspects, if a condition associated with the resource block allocation is satisfied, then transmission of uplink data on the first subcarrier frequency and the second subcarrier frequency (e.g., simultaneously or concurrently) may cause intermodulation interference.

For example, for any allocated subcarrier frequencies g1 and g2, uplink transmissions may cause intermodulation interference if the following conditions are satisfied:

$$(m1 \times g1 + m2 \times g2 > \text{victimFreqStart} - \text{freqMargin}) \text{ AND}$$

$$(m1 \times g1 + m2 \times g2 > \text{victimFreqStop} + \text{freqMargin})$$

In the above expressions, g1 may represent a first subcarrier frequency of a first resource block allocated for uplink transmission on a first component carrier, g2 may represent a second subcarrier frequency of a second resource block allocated for uplink transmission on a second component carrier, m1 may represent a first intermodulation coefficient, and m2 may represent a second intermodulation coefficient. In some aspects, the intermodulation coefficients may be determined based at least in part on an uplink carrier aggregation configuration of UE 615 (e.g., CA_2A-4A, CA_3-5A, etc.). Further, victimFreqStart may represent a lower frequency boundary of an RF spectrum band that may be subject to intermodulation interference (e.g., a GNSS spectrum band), victimFreqStop may represent an upper frequency boundary of the RF spectrum band that may be subject to intermodulation interference, and freqMargin may represent a configurable frequency margin value (e.g., 2 MHz, or the like).

In some aspects, an RF spectrum band may be associated with an interference requirement, such as a requirement that a threshold number of subframes n, out of a group of subframes representing a time period T, be free from interference (e.g., that 2 out of every 4 subframes are interference-free, that 10 out of every 20 subframes are interference-free, etc.). In example 900, UE 615 may be configured such that 2 out of every 4 subframes are free from interference (e.g., n=2, T=4). In this case, if the number of subframes for which uplink data is to be transmitted on both the first cell (e.g., the PCell) and the second cell (e.g., the SCell) during a time period satisfies a threshold, and if the resource block allocation indicated by the above expressions are satisfied for resource blocks that transmit the uplink data in those subframes, then UE 615 may drop an uplink grant allocated for the first cell or the second cell.

In this way, UE 615 may autonomously drop uplink grants (e.g., of the PCell and/or the SCell) if the network schedules both the PCell and the SCell (in a same subframe) more than the threshold number of times n during the time period T. In some aspects, UE 615 may mark a subframe as having intermodulation interference if both the PCell and the SCell have uplink grants for the subframe and if the resource blocks on which the grants are allocated satisfy the expressions indicated above. Additionally, or alternatively, UE 615 may mark a subframe as having intermodulation interference if both the PCell and the SCell have uplink grants for the subframe or if the resource blocks on which the grants are allocated satisfy the expressions indicated above. Otherwise, if the PCell and the SCell do not both have uplink grants for the subframe, or if the resource blocks on which the grants are allocated do not satisfy the expressions indicated above, then UE 615 may mark the subframe as being free from intermodulation interference. UE 615 may use these markings to determine a number of subframes associated with intermodulation interference, which may be used when determining whether to drop an uplink grant of the PCell and/or the SCell. In this way, UE 615 may ensure that any time period of subframes satisfies an interference requirement associated with an RF spectrum band, such as a GNSS band.

For example, as shown in FIG. 9A, UE 615 may receive an uplink grant for the PCell and an uplink grant for the SCell for subframe 1. In this case, the time period T only includes one subframe (e.g., an initial subframe 1), so UE 615 does not drop either of the uplink grants for the PCell or the SCell because GNSS may permit up to two subframes having intermodulation interference for any time period of 4 consecutive subframes. Thus, UE 615 may transmit uplink data for subframe 1, as shown. If the resource block allocation for these uplink grants satisfies a condition (e.g., the expression(s) indicated above), then UE 615 may mark subframe 1 as having intermodulation interference because uplink data is transmitted for both the PCell and the SCell for subframe 1.

As shown in FIG. 9B, UE 615 may receive an uplink grant for the PCell and an uplink grant for the SCell for subframe 2. In this case, the time period T includes two subframes (e.g., subframe 1 and subframe 2), so UE 615 does not drop either of the uplink grants for the PCell or the SCell because GNSS may permit up to two subframes having intermodulation interference for any time period of four consecutive subframes (e.g., n=2, T=4). Thus, UE 615 may transmit uplink data for subframe 2, as shown. If the resource block allocation for these uplink grants satisfies a condition (e.g., the expression(s) indicated above), then UE 615 may mark subframe 2 as having intermodulation interference because uplink data is transmitted for both the PCell and the SCell for subframe 2.

As shown in FIG. 9C, UE 615 may receive an uplink grant for the PCell and an uplink grant for the SCell for subframe 3. In this case, the time period T includes three subframes (e.g., subframe 1, subframe 2, and subframe 3). If the resource block allocation for these uplink grants satisfies a condition (e.g., the expression(s) indicated above), then UE 615 may drop the uplink grant for the SCell, as shown, because the number of subframes for which uplink data is transmitted on both the PCell and the SCell (e.g., two, for subframe 1 and subframe 2) satisfies the threshold number of subframes (e.g., n=2). Thus, UE 615 may transmit uplink data for the PCell in subframe 3, but may drop the uplink grant for the SCell in subframe 3, as shown. This ensures that no more than two subframes will have intermodulation interference for any time period of four consecutive subframes (e.g., n=2, T=4). Further, UE 615 may mark subframe 3 as being free from intermodulation interference because uplink data is not transmitted for both the PCell and the SCell for subframe 3 (e.g., because the SCell uplink grant for subframe 3 was dropped).

As shown in FIG. 9D, UE 615 may receive an uplink grant for the PCell and an uplink grant for the SCell for subframe 4. In this case, the time period T includes the full length of the time period of four subframes (e.g., subframe 1, subframe 2, subframe 3, and subframe 4). If the resource block allocation for these uplink grants satisfies a condition (e.g., the expression(s) indicated above), then UE 615 may drop the uplink grant for the SCell, as shown, because the number of subframes for which uplink data is transmitted on both the PCell and the SCell (e.g., two, for subframe 1 and subframe 2) satisfies the threshold number of subframes (e.g., n=2). Thus, UE 615 may transmit uplink data for the PCell in subframe 4, but may drop the uplink grant for the SCell in subframe 4, as shown. Further, UE 615 may mark subframe 4 as being free from intermodulation interference because uplink data is not transmitted for both the PCell and the SCell for subframe 4.

As shown in FIG. 9E, UE 615 may receive an uplink grant for the PCell and an uplink grant for the SCell for subframe 5. In this case, the time period T includes four subframes, including subframe 5 and three subframes preceding subframe 5 (e.g., subframes 2, 3, and 4). In this case, UE 615 does not drop either of the uplink grants for the PCell or the SCell for subframe 5 because GNSS may permit up to two subframes having intermodulation interference for any time period of four consecutive subframes (e.g., n=2, T=4). In this case, the two subframes with intermodulation interference in the time period are subframes 2 and 5, since UE 615 dropped uplink grants on the SCell for subframes 3 and 4. Thus, UE 615 may transmit uplink data for subframe 5, as shown. If the resource block allocation for these uplink grants satisfies a condition (e.g., the expression(s) indicated above), then UE 615 may mark subframe 5 as having intermodulation interference because uplink data is transmitted for both the PCell and the SCell for subframe 5.

As shown in FIG. 9F, UE 615 may receive an uplink grant for the PCell, but not for the SCell, for subframe 6. In this case, UE 615 need not drop any uplink grants because an uplink grant was received for only one component carrier for subframe 6 (e.g., the PCell), which does not cause intermodulation interference. Thus, UE 615 may transmit uplink data for the PCell for subframe 6, and may mark subframe 6 as being free from intermodulation interference because uplink data is not transmitted for both the PCell and the SCell for subframe 6.

As shown in FIG. 9G, UE 615 may receive an uplink grant for the SCell, but not for the PCell, for subframe 7. In this case, UE 615 need not drop any uplink grants because an uplink grant was received for only one component carrier for subframe 7 (e.g., the SCell), which does not cause intermodulation interference. Thus, UE 615 may transmit uplink data for the SCell for subframe 7, and may mark subframe 7 as being free from intermodulation interference because uplink data is not transmitted for both the PCell and the SCell for subframe 7.

As shown in FIG. 9H, UE 615 may receive an uplink grant for the PCell and an uplink grant for the SCell for subframe 8. In this case, the time period T includes four subframes, including subframe 8 and three subframes preceding subframe 8 (e.g., subframes 5, 6, and 7). In this case, UE 615 does not drop either of the uplink grants for the PCell or the SCell for subframe 8 because GNSS may permit up to two subframes having intermodulation interference for any time period of four consecutive subframes (e.g., n=2, T=4). In this case, the two subframes with intermodulation interference in the time period are subframes 5 and 8, since uplink grants were not received for both the PCell and the SCell for subframes 6 and 7. Thus, UE 615 may transmit uplink data for subframe 8, as shown. If the resource block allocation for these uplink grants satisfies a condition (e.g., the expression(s) indicated above), then UE 615 may mark subframe 8 as having intermodulation interference because uplink data is transmitted for both the PCell and the SCell for subframe 8.

As shown in FIG. 9I, UE 615 may receive an uplink grant for the PCell and an uplink grant for the SCell for subframe 9. In this case, the time period T includes four subframes, including subframe 9 and three subframes preceding subframe 9 (e.g., subframes 6, 7, and 8). In this case, UE 615 does not drop either of the uplink grants for the PCell or the SCell for subframe 9 because GNSS may permit up to two subframes having intermodulation interference for any time period of four consecutive subframes (e.g., n=2, T=4). In this case, the two subframes with intermodulation interference in the time period are subframes 8 and 9, since uplink grants were not received for both the PCell and the SCell for subframes 6 and 7. Thus, UE 615 may transmit uplink data for subframe 9, as shown. If the resource block allocation for these uplink grants satisfies a condition (e.g., the expression(s) indicated above), then UE 615 may mark subframe 9 as having intermodulation interference because uplink data is transmitted for both the PCell and the SCell for subframe 9.

As shown in FIG. 9J, UE 615 may receive an uplink grant for the PCell and an uplink grant for the SCell for subframe 10. In this case, the time period T includes four subframes, including subframe 10 and three subframes preceding subframe 10 (e.g., subframes 7, 8, and 9). If the resource block allocation for these uplink grants satisfies a condition (e.g., the expression(s) indicated above), then UE 615 may drop the uplink grant for the SCell, as shown, because the number of subframes for which uplink data is transmitted on both the PCell and the SCell (e.g., two, for subframes 8 and 9) satisfies the threshold number of subframes (e.g., n=2). Thus, UE 615 may transmit uplink data for the PCell in subframe 10, but may drop the uplink grant for the SCell in subframe 10, as shown. Further, UE 615 may mark subframe 10 as being free from intermodulation interference because uplink data is not transmitted for both the PCell and the SCell for subframe 10.

As shown in FIG. 9K, UE 615 may receive an uplink grant for the PCell, but not for the SCell, for subframe 11. In this case, UE 615 need not drop any uplink grants because an uplink grant was received for only one component carrier for subframe 11 (e.g., the PCell), which does not cause intermodulation interference. Thus, UE 615 may transmit uplink data for the PCell for subframe 11, and may mark subframe 11 as being free from intermodulation interference because uplink data is not transmitted for both the PCell and the SCell for subframe 11.

As shown in FIG. 9L, UE 615 may receive an uplink grant for the PCell and an uplink grant for the SCell for subframe 12. In this case, the time period T includes four subframes, including subframe 12 and three subframes preceding subframe 12 (e.g., subframes 9, 10, and 11). In this case, UE 615 does not drop either of the uplink grants for the PCell or the SCell for subframe 12 because GNSS may permit up to two subframes having intermodulation interference for any time period of four consecutive subframes (e.g., n=2, T=4). In this case, the two subframes with intermodulation interference in the time period are subframes 9 and 12, since uplink grants were not received for both the PCell and the SCell for subframe 11, and since an SCell uplink grant was dropped for subframe 10. Thus, UE 615 may transmit uplink data for subframe 12, as shown. If the resource block allocation for these uplink grants satisfies a condition (e.g., the expression(s) indicated above), then UE 615 may mark subframe 12 as having intermodulation interference because uplink data is transmitted for both the PCell and the SCell for subframe 12.

As shown in FIG. 9M, UE 615 may receive an uplink grant for the PCell and an uplink grant for the SCell for subframe 13. In this case, the time period T includes four subframes, including subframe 13 and three subframes preceding subframe 13 (e.g., subframes 10, 11, and 12). In this case, UE 615 does not drop either of the uplink grants for the PCell or the SCell for subframe 13 because GNSS may permit up to two subframes having intermodulation interference for any time period of four consecutive subframes (e.g., n=2, T=4). In this case, the two subframes with intermodulation interference in the time period are subframes 12 and 13, since uplink grants were not received for both the PCell and the SCell for subframe 11, and since an SCell uplink grant was dropped for subframe 10. Thus, UE 615 may transmit uplink data for subframe 13, as shown. If the resource block allocation for these uplink grants satisfies a condition (e.g., the expression(s) indicated above), then UE 615 may mark subframe 13 as having intermodulation interference because uplink data is transmitted for both the PCell and the SCell for subframe 13.

As shown in FIG. 9N, UE 615 may receive an uplink grant for the PCell, but not for the SCell, for subframe 14. In this case, UE 615 need not drop any uplink grants because an uplink grant was received for only one component carrier for subframe 14 (e.g., the PCell), which does not cause intermodulation interference. Thus, UE 615 may transmit uplink data for the PCell for subframe 14, and may mark subframe 14 as being free from intermodulation interference because uplink data is not transmitted for both the PCell and the SCell for subframe 14.

As shown in FIG. 9O, UE 615 may receive an uplink grant for the PCell and an uplink grant for the SCell for subframe 15. In this case, the time period T includes four subframes, including subframe 15 and three subframes preceding subframe 15 (e.g., subframes 12, 13, and 14). If the resource block allocation for these uplink grants satisfies a condition (e.g., the expression(s) indicated above), then UE 615 may drop the uplink grant for the SCell, as shown, because the number of subframes for which uplink data is transmitted on both the PCell and the SCell (e.g., two, for subframes 12 and 13) satisfies the threshold number of subframes (e.g., n=2). Thus, UE 615 may transmit uplink data for the PCell in subframe 15, but may drop the uplink grant for the SCell in subframe 15, as shown. Further, UE 615 may mark subframe 15 as being free from intermodulation interference because uplink data is not transmitted for both the PCell and the SCell for subframe 15.

As shown in FIG. 9P, UE 615 may receive an uplink grant for the PCell and an uplink grant for the SCell for subframe 16. In this case, the time period T includes four subframes, including subframe 16 and three subframes preceding subframe 16 (e.g., subframes 13, 14, and 15). In this case, UE 615 does not drop either of the uplink grants for the PCell or the SCell for subframe 16 because GNSS may permit up to two subframes having intermodulation interference for any time period of four consecutive subframes (e.g., n=2, T=4). In this case, the two subframes with intermodulation interference in the time period are subframes 13 and 16, since uplink grants were not received for both the PCell and the SCell for subframe 14, and since an SCell uplink grant was dropped for subframe 15. Thus, UE 615 may transmit uplink data for subframe 16, as shown. If the resource block allocation for these uplink grants satisfies a condition (e.g., the expression(s) indicated above), then UE 615 may mark subframe 16 as having intermodulation interference because uplink data is transmitted for both the PCell and the SCell for subframe 16.

UE 615 may continue to selectively drop uplink grants in this manner to ensure that no more than a threshold number of subframes will have intermodulation interference during a time period. In some aspects, UE 615 may drop an uplink grant for the PCell rather than the SCell. For example, UE 615 may determine that an uplink grant on the SCell is to be used for control information (e.g., hybrid automatic repeat request (HARQ) feedback, channel state information, or the like), and may drop an uplink grant for the PCell rather than the SCell based at least in part on this determination. Additionally, or alternatively, the time period may be a static time period rather than a dynamic time period (e.g., when timing boundaries associated with GNSS are stored by UE 615). In some aspects, the threshold number of subframes may represent all subframes in the time period. For example, if UE 615 is engaged in an emergency call (e.g., an E911 call), then UE 615 may drop all uplink grants for a component carrier (e.g., the SCell).

As indicated above, FIGS. 9A-9P are provided as an example. Other examples are possible and may differ from what was described in connection with FIGS. 9A-9P.

FIG. 10 is a flow diagram of an example process 1000 for dropping uplink grants in carrier aggregation to mitigate intermodulation interference, in accordance with various aspects of the present disclosure. In some aspects, one or more process blocks of FIG. 10 may be performed by one or more UEs described herein. In some aspects, one or more process blocks of FIG. 10 may be performed by another device or a plurality of devices separate from or including a UE.

As shown in FIG. 10, in some aspects, process 1000 may include receiving a first uplink grant for a first cell that uses a first component carrier (block 1010), and receiving a second uplink grant for a second cell that uses a second component carrier (block 1020). For example, UE 615 may receive a first uplink grant for a first cell, such as a primary cell (e.g., a PCell), and may receive a second uplink grant for a second cell, such as a secondary cell (e.g., an SCell). In some aspects, the first uplink grant and the second uplink grant may be received for the same subframe.

As shown in FIG. 10, in some aspects, process 1000 may include determining at least one of: a number of subframes for which uplink data is transmitted on both the first cell and the second cell during a time period, or a resource block allocation associated with the first cell and the second cell (block 1030). For example, UE 615 may determine a number of subframes for which uplink data is transmitted on both the first cell and the second cell during a time period. Additionally, or alternatively, UE 615 may determine a resource block allocation associated with the first cell or the second cell. In some aspects, the first uplink grant and the second uplink grant may be for a same subframe, and the time period may include the subframe and zero or more subframes that precede the subframe. Additionally, or alternatively, the time period may include the subframe and/or a plurality of subframes that precede the subframe. Thus, in some aspects, the time period may be a dynamic time period. In some aspects, the time period may be a static time period determined based at least in part on timing boundaries associated with GNSS.

As shown in FIG. 10, in some aspects, process 1000 may include dropping at least one of the first uplink grant or the second uplink grant (e.g., uplink data is not transmitted using such grant) based at least in part on at least one of: a determination that the number of subframes satisfies a threshold number of subframes, or a determination that the resource block allocation satisfies a condition (block 1040). For example, UE 615 may drop at least one of the first uplink grant or the second uplink grant. In some aspects, UE 615 may drop at least one of the first uplink grant or the second uplink grant based at least in part on a determination that the number of subframes satisfies a threshold number of subframes. Additionally, or alternatively, UE 615 may drop at least one of the first uplink grant or the second uplink grant based at least in part on a determination that the resource block allocation satisfies a condition.

In some aspects, the condition may indicate that the resource block allocation satisfies an expression. Additionally, or alternatively, the condition may indicate that the resource block allocation causes intermodulation interference with an RF spectrum band. In some aspects, the RF spectrum band may be associated with a GNSS. In some aspects, the RF spectrum band may be associated with a wireless network, such as a WLAN (e.g., a WiFi network) or a WPAN (e.g., a Bluetooth network). In some aspects, the threshold number of subframes may also be associated with the GNSS.

In some aspects, the first cell may be a primary cell, and the second cell may be a secondary cell. In some aspects, UE 615 may drop the second uplink grant for the secondary cell. In some aspects, UE 615 may drop the first uplink grant for the primary cell. For example, UE 615 may determine that the second uplink grant is to be used for control information to be provided via the secondary cell. In this case, UE 615 may drop the first uplink grant for the primary cell based at least in part on determining that the second uplink grant is to be used for the control information to be provided via the secondary cell.

In some aspects, the threshold number of subframes may represent all subframes in the time period (e.g., when UE 615 is engaged in an emergency call, such as an E911 call). For example, when UE 615 is engaged in an emergency call, UE 615 may drop the first uplink grant or the second uplink grant for all subframes in the time period (e.g., while the emergency call is active). In this way, UE 615 may avoid interference with emergency calls.

In some aspects, the condition may be based at least in part on a first intermodulation coefficient, a first frequency associated with a first resource block allocation on the first cell, a second intermodulation coefficient, a second frequency associated with a second resource block allocation on the second cell, and a frequency range associated with a radio frequency spectrum band, such as a GNSS spectrum band.

In some aspects, UE 615 may mark a subframe associated with the first uplink grant and the second uplink grant as having intermodulation interference based at least in part on a determination that the condition is satisfied and the number of subframes does not satisfy the threshold number of subframes. In some aspects, UE 615 may mark a subframe associated with the first uplink grant and the second uplink grant as being free from intermodulation interference based at least in part on a determination that the condition is not satisfied or the number of subframes satisfies the threshold number of subframes. Additionally, or alternatively, UE 615 may store the marking for use with the time period.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Techniques described herein may be used to mitigate intermodulation interference when a UE is configured for carrier aggregation, and particularly to mitigate intermodulation interference in RF spectrum bands associated with GNSS. In this way, a position of the UE may be determined more accurately, errors in GNSS signals may be reduced, or the like.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover: a; b; c; a and b; a and c; b and c; and a, b and c.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for wireless communication, comprising:
    receiving, by a user equipment, a first uplink grant for a first cell that uses a first component carrier;
    receiving, by the user equipment, a second uplink grant for a second cell that uses a second component carrier;
    determining, by the user equipment, a number of subframes for which uplink data is transmitted on both the first cell and the second cell during a time period;
    determining a resource block allocation associated with the first cell and the second cell; and
    dropping, by the user equipment, at least one of the first uplink grant or the second uplink grant based at least in part on a determination that the number of subframes satisfies a threshold number of subframes and a determination that the resource block allocation satisfies a condition,
        wherein the condition indicates that the resource block allocation causes intermodulation interference with a radio frequency spectrum band.

2. The method of claim 1, wherein the first uplink grant and the second uplink grant are for a same subframe.

3. The method of claim 1, wherein the radio frequency spectrum band is associated with a global navigation satellite system.

4. The method of claim 3, wherein the threshold number of subframes is associated with interference to the global navigation satellite system.

5. The method of claim 1, wherein the first cell is a primary cell and the second cell is a secondary cell; and
    wherein dropping at least one of the first uplink grant or the second uplink grant comprises dropping the second uplink grant for the secondary cell.

6. The method of claim 1, wherein the first cell is a primary cell and the second cell is a secondary cell;
    wherein the method further comprises determining that the second uplink grant is to be used for control information to be provided via the secondary cell; and
    wherein dropping at least one of the first uplink grant or the second uplink grant comprises dropping the first uplink grant for the primary cell based at least in part on determining that the second uplink grant is to be used for the control information.

7. The method of claim 1, wherein the first uplink grant and the second uplink grant are for a subframe; and
    wherein the time period includes the subframe.

8. The method of claim 1, wherein the time period is a static time period determined based at least in part on timing boundaries associated with a global navigation satellite system.

9. The method of claim 1, wherein the threshold number of subframes represents all subframes in the time period.

10. The method of claim 1,
    wherein the condition is based at least in part on a first intermodulation coefficient, a first frequency associated with a first resource block allocation on the first cell, a second intermodulation coefficient, a second frequency associated with a second resource block allocation on the second cell, and a frequency range associated with the radio frequency spectrum band.

11. The method of claim 1, further comprising:
    marking a subframe associated with the first uplink grant and the second uplink grant as having intermodulation interference based at least in part on a determination that the resource block allocation satisfies the condition and the number of subframes does not satisfy the threshold number of subframes; and
    storing the marking for use with the time period.

12. The method of claim 1, further comprising:
    marking a subframe associated with the first uplink grant and the second uplink grant as being free from intermodulation interference based at least in part on a determination that the resource block allocation does not satisfy the condition or the number of subframes satisfies the threshold number of subframes; and
    storing the marking for use with the time period.

13. A user equipment (UE) for wireless communication, comprising:
    memory; and
    one or more processors, coupled to the memory, configured to:
        receive a first uplink grant for a first cell that uses a first component carrier;
        receive a second uplink grant for a second cell that uses a second component carrier;
        determine a number of subframes for which uplink data is transmitted on both the first cell and the second cell during a time period;
        determine a resource block allocation associated with the first cell and the second cell; and
        drop at least one of the first uplink grant or the second uplink grant based at least in part on a determination that the number of subframes satisfies a threshold number of subframes and a determination that the resource block allocation satisfies a condition,
            wherein the condition indicates that the resource block allocation causes intermodulation interference with a radio frequency spectrum band.

14. The UE of claim 13, wherein the first uplink grant and the second uplink grant are for a same subframe.

15. The UE of claim 13, wherein the radio frequency spectrum band is associated with a global navigation satellite system.

16. The UE of claim 15, wherein the threshold number of subframes is associated with interference to the global navigation satellite system.

17. The UE of claim 13, wherein the first cell is a primary cell and the second cell is a secondary cell; and
wherein the one or more processors, when dropping at least one of the first uplink grant or the second uplink grant, are further configured to:
drop the second uplink grant for the secondary cell.

18. The UE of claim 13, wherein the first cell is a primary cell and the second cell is a secondary cell;
wherein the one or more processors are further configured to:
determine that the second uplink grant is to be used for control information to be provided via the secondary cell; and
wherein the one or more processors, when dropping at least one of the first uplink grant or the second uplink grant, are further configured to:
drop the first uplink grant for the primary cell based at least in part on determining that the second uplink grant is to be used for the control information.

19. The UE of claim 13, wherein the first uplink grant and the second uplink grant are for a subframe; and
wherein the time period includes the subframe.

20. The UE of claim 13, wherein the time period is a static time period determined based at least in part on timing boundaries associated with a global navigation satellite system.

21. The UE of claim 13, wherein the threshold number of subframes represents all subframes in the time period.

22. The UE of claim 13,
wherein the condition is based at least in part on a first intermodulation coefficient, a first frequency associated with a first resource block allocation on the first cell, a second intermodulation coefficient, a second frequency associated with a second resource block allocation on the second cell, and a frequency range associated with the radio frequency spectrum band.

23. The UE of claim 13, wherein the one or more processors are further configured to:
mark a subframe associated with the first uplink grant and the second uplink grant as having intermodulation interference based at least in part on a determination that the resource block allocation satisfies the condition and the number of subframes does not satisfy the threshold number of subframes; and
store the marking for use with the time period.

24. The UE of claim 13, wherein the one or more processors are further configured to:
mark a subframe associated with the first uplink grant and the second uplink grant as being free from intermodulation interference based at least in part on a determination that the resource block allocation does not satisfy the condition or the number of subframes satisfies the threshold number of subframes; and
store the marking for use with the time period.

25. A non-transitory computer-readable medium storing instructions for wireless communication, the instructions comprising:
one or more instructions that, when executed by one or more processors, cause the one or more processors to:
receive a first uplink grant for a first cell that uses a first component carrier;
receive a second uplink grant for a second cell that uses a second component carrier;
determine a number of subframes for which uplink data is transmitted on both the first cell and the second cell during a time period;
determine a resource block allocation associated with the first cell and the second cell; and
drop at least one of the first uplink grant or the second uplink grant based at least in part on a determination that the number of subframes satisfies a threshold number of subframes and a determination that the resource block allocation satisfies a condition,
wherein the condition indicates that the resource block allocation causes intermodulation interference with a radio frequency spectrum band.

26. The non-transitory computer-readable medium of claim 25,
wherein the radio frequency spectrum band is associated with a global navigation satellite system.

27. An apparatus for wireless communication, comprising:
means for receiving a first uplink grant for a first cell that uses a first component carrier;
means for receiving a second uplink grant for a second cell that uses a second component carrier;
means for determining a number of subframes for which uplink data is transmitted on both the first cell and the second cell during a time period;
means for determining a resource block allocation associated with the first cell and the second cell; and
means for dropping at least one of the first uplink grant or the second uplink grant based at least in part on a determination that the number of subframes satisfies a threshold number of subframes and a determination that the resource block allocation satisfies a condition,
wherein the condition indicates that the resource block allocation causes intermodulation interference with a radio frequency spectrum band.

28. The apparatus of claim 27,
wherein the radio frequency spectrum band is associated with a global navigation satellite system.

29. The non-transitory computer-readable medium of claim 25, wherein the first uplink grant and the second uplink grant are for a same subframe.

30. The apparatus of claim 27, wherein the first uplink grant and the second uplink grant are for a same subframe.

* * * * *